US006887813B2

(12) United States Patent
Ginosar et al.

(10) Patent No.: US 6,887,813 B2
(45) Date of Patent: *May 3, 2005

(54) METHOD FOR REACTIVATING SOLID CATALYSTS USED IN ALKYLATION REACTIONS

(75) Inventors: Daniel M. Ginosar, Idaho Falls, ID (US); David N. Thompson, Idaho Falls, ID (US); Kyle Coates, Shelley, ID (US); David J. Zalewski, Proctorville, OH (US); Robert V. Fox, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 46 days.

This patent is subject to a terminal disclaimer.

(21) Appl. No.: 10/412,806

(22) Filed: Apr. 9, 2003

(65) Prior Publication Data

US 2003/0207751 A1 Nov. 6, 2003

Related U.S. Application Data

(63) Continuation of application No. 09/593,186, filed on Jun. 14, 2000, now Pat. No. 6,579,821.

(51) Int. Cl.$^7$ ............................................. B01J 20/34
(52) U.S. Cl. ........................................................ 502/31
(58) Field of Search .............................. 502/22, 24, 29, 502/31

(56) References Cited

U.S. PATENT DOCUMENTS

| | | | |
|---|---|---|---|
| 3,725,299 | A | 4/1973 | Turnock et al. |
| 4,058,575 | A | 11/1977 | Cahn et al. |
| 4,124,528 | A | 11/1978 | Modell |
| 4,605,811 | A | 8/1986 | Tiltscher et al. |
| 4,721,826 | A | 1/1988 | Tiltscher et al. |
| 4,956,518 | A | 9/1990 | Child et al. |
| 4,982,043 | A | 1/1991 | Hasselbring |
| 5,177,298 | A | 1/1993 | Yon et al. |
| 5,304,698 | A | 4/1994 | Husain |
| 5,310,713 | A | 5/1994 | Kojima et al. |
| 5,326,923 | A | 7/1994 | Cooper et al. |
| 5,345,028 | A | 9/1994 | Alerasool |
| 5,489,732 | A | 2/1996 | Zhang et al. |
| 5,491,277 | A | 2/1996 | Stine et al. |
| 5,712,213 | A | 1/1998 | Joly et al. |
| 5,907,075 | A | 5/1999 | Subramanuiam et al. |
| 5,916,835 | A | 6/1999 | Carroll et al. |

FOREIGN PATENT DOCUMENTS

| | | |
|---|---|---|
| CA | 2273333 | 6/1998 |
| EP | 0 680 941 A1 | 4/1995 |

OTHER PUBLICATIONS

Zurer, P., Green Organic Synthesis Dives into Near–Critical Water, C&EN, Jan. 3, 2000, pp. 26–27.
"Alkylation," Encyclopedia of Chemical Technology, 4$^{th}$ Edition, vol. 2, pp. 84–112, no date.
Seapan, M. and Guohui, Z., Chapter 9 "Dekoking and Regeneration of a Hydrotreating Catalyst by Supercritical Extraction", 1989 American Chemical Society, no month.
Phillip B. West et al., "Clamping Systems for Large Downhole Seismic Sensor Arrays" Idaho National Engineering and Environmental Laboratory, Jun. 2001.
Kirk–Othmer Encyclopedia of Chemical Techology, vol. 21, pp. 770–800, 3rd ed. (1983), no month.
J.A. Martens, et al., Estimation of the void structure and pore dimensions of molecular sieve zeolites using the hydroconversion of n–decane, Zeolites 4, 98 (1984), no month.
W. Hölderich, et al., Industrial application of zeolite catalysts in petrochemical processes, Ger. Chem. Eng. 8, 377 (1985), no month.
W. Hölderich, et al., Zeolites: Catalysts for organic syntheses, Angew. Chem. Int. Ed. Engl. 27, 226 (1988), no month.
S.M. Csicsery, Catalysis by shape selective zeolites—Science and technology, Pure & Appl. Chem. 58(6), 841(1986), no month.
L. Fan et al., Supercritical–Phase Alkylation Reaction on Solid Acid Catalysts: Mechanistic Study and Catalyst Development, Ind. Eng. Chem. Res., vol. 36, 1997, pp. 1458–1463, XP002292033.
European Patent Office Supplementary European Search Report, Aug. 11, 2004.
Zhao, Dongbin et al, "Ionic Liquids: Applications in Catalysis", Catalysis Today 74 (2002) 157–189.

Primary Examiner—Steven Bos
Assistant Examiner—Edward M. Johnson
(74) Attorney, Agent, or Firm—Trask Britt, P.C.

(57) ABSTRACT

A method for reactivating a solid alkylation catalyst is provided which can be performed within a reactor that contains the alkylation catalyst or outside the reactor. Effective catalyst reactivation is achieved whether the catalyst is completely deactivated or partially deactivated. A fluid reactivating agent is employed to dissolve catalyst fouling agents and also to react with such agents and carry away the reaction products. The deactivated catalyst is contacted with the fluid reactivating agent under pressure and temperature conditions such that the fluid reactivating agent is dense enough to effectively dissolve the fouling agents and any reaction products of the fouling agents and the reactivating agent. Useful pressures and temperatures for reactivation include near-critical, critical, and supercritical pressures and temperatures for the reactivating agent. The fluid reactivating agent can include, for example, a branched paraffin containing at least one tertiary carbon atom, or a compound that can be isomerized to a molecule containing at least one tertiary carbon atom.

69 Claims, 20 Drawing Sheets

METHOD FOR REACTIVATING SOLID CATALYSTS USED IN ALKYLATION REACTIONS

RELATED APPLICATION

This application is a Continuation of U.S. patent application Ser. No. 09/593,186, filed Jun. 14, 2000, now U.S. Pat. No. 6,579,821.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

This invention relates to catalyst reactivation methods. More particularly, this invention relates to methods for reactivating totally or partially deactivated alkylation catalysts with a reactive near-critical, critical or supercritical fluid reactivating agent.

2. Related Technology

Nomenclature

As conventionally accepted in the literature on alkylation, terms such as alkanes, paraffins and paraffinic hydrocarbons will hereinafter refer to open-chain saturated hydrocarbons. The suffix -ene is adopted for straight-chain monounsaturated hydrocarbons, so that a term such as butene refers to at least one of the compounds 1-butene and 2-butene. The suffix -ylene is hereinafter employed to refer to a monounsaturated hydrocarbon that consists of the same number of carbon atoms as expressed by the name. For example, the term butylene refers to at least one of the compounds 1-butene, 2-butene, and isobutylene, the latter compound also is known as 2-methylpropene. Terms such as alkenes, olefins and olefinic hydrocarbons generically refer to monounsaturated hydrocarbons.

The prefix iso- is generically used to refer to branched alkanes or alkenes that have one or more methyl groups only as side chains. Aromatic hydrocarbons refer to hydrocarbons that have at least one aromatic ring and to hydrocarbons which, although strictly not aromatic, contain conjugation to the extent such that they undergo alkylation reactions like aromatic compounds.

The term $C_n$ describes a hydrocarbon with n carbon atoms, whether the hydrocarbon is linear, branched, paraffinic, olefinic or aromatic. The notation $C_n-C_m$ describes at least one hydrocarbon in the set of hydrocarbons such that the number of carbon atoms ranges from n to m for any individual hydrocarbon in the set. The notation $C_{n \geq p}$ or $C_{p+}$ refers to at least one hydrocarbon with at least p carbon atoms, and it often refers to a mixture of hydrocarbons such that the number of carbon atoms is at least p' for any individual hydrocarbon in the mixture.

Processes

The term alkylation generically refers to the addition of an alkyl group to a molecule that is to be alkylated. Alkylation of alkenes to produce alkylation products, or alkylate, is an addition of a saturated hydrocarbon (R—H) to an alkene to yield a saturated hydrocarbon of higher molar mass. This reaction is generically represented by the following chemical equation:

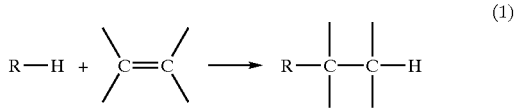

Alkylation is extensively used in the petroleum industry to produce medium- or large-mass hydrocarbons from smaller molecules. One of the more important alkylation reactions is the addition of isobutane to 2-butene to produce 2,2,4-trimethylpentane according to the following equation:

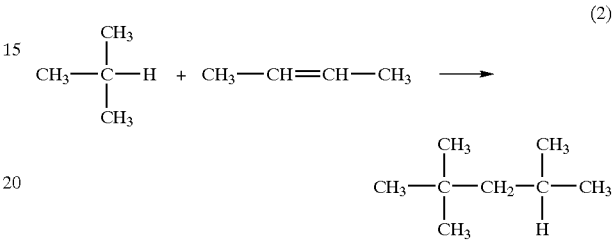

This reaction is conventionally carried out in the presence of an acid such as sulfuric acid or anhydrous hydrofluoric acid.

According to the nomenclature previously introduced, the first reactant in equation (1) is an alkane, paraffin or paraffinic hydrocarbon, whereas the second reactant in the same equation is an alkene, olefin, or olefinic hydrocarbon that can also correspond in that equation with an alkylene. More specifically, the paraffin which is listed as the first reactant in equation (2) is isobutane, and the alkylene which is listed as the second reactant in the same equation is 2-butene. Furthermore, equations (1) and (2) describe with varying degrees of generality paraffin alkylation, or the addition reaction of a paraffin and an olefin. Equation (2), in particular, describes the addition reaction of an isoparaffin and an olefin where the alkylate is an isoalkane.

The notation used in equation (1) describes a reaction that includes, for example, the reaction of a $C_4-C_8$ paraffinic hydrocarbon with a $C_2-C_{12}$ olefinic hydrocarbon to produce a branched paraffinic hydrocarbon. In the particular example provided by equation (2), a $C_4$ isoparaffin reacts with a $C_4$ olefin to produce a $C_8$ isoparaffin.

As indicated above, aromatic hydrocarbons can also be alkylated. For example, benzene can be alkylated with ethylene to produce ethylbenzene, a precursor of styrene, according to the zeolite catalyzed reaction that is described by equation (3):

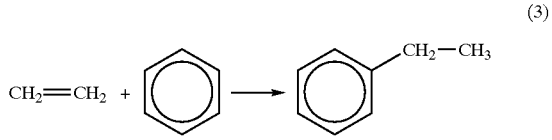

Ethylbenzene yields, upon dehydrogenation, styrene, which is the simplest and most important member of a series of unsaturated aromatic compounds. The zeolite-catalyzed alkylation of benzene by ethylene has been described in a number of sources. See, for example, Kirk-Othmer Encyclopedia of Chemical Technology, Vol.21, pp. 770–800, 3rd ed. (1983).

The olefins in equations (1)–(3) are the respective alkylating agents. Generally, in alkylation reactions, the amount of the reactant to be alkylated exceeds the amount of the alkylating agent. Thus, when an aromatic hydrocarbon is alkylated with an olefin, it is preferred to operate with a molar ratio of the aromatic hydrocarbon to the olefin greater than 1:1, and preferably from about 2:1 to 5:1 as measured by the flow rates into the reaction zone. Similarly, it is preferable to operate with a paraffin-to-olefin molar ratio greater than 2:1. Preferably, the paraffin-to-olefin molar ratio exceeds 3:1. However, ratios as high as 100:1 can be employed. The use of a large-pore zeolite with a Lewis acid reportedly increases the activity and selectivity of the zeolite, thus permitting effective alkylation at high olefin weight hour space velocity (OWHSV) and low isoparaffin/ olefin ratio. The OWHSV is defined as the amount of olefin fed to the reactor per unit catalyst per hour (i.e., g olefin (g catalyst)$^{-1}$ h$^{-1}$).

The principal industrial application of paraffin alkylation is in the production of premium-quality fuels for internal combustion engines. More specifically, alkylation is mainly used to provide a high octane blending alkylate for automotive fuels that also increases the fuel sensitivity to octane-enhancing agents. Alkylate components are typically characterized by clean, low emission burning. Because of these properties, alkylate production capacity is expected to increase as specifications for gasoline become more stringent.

Most commercial alkylations rely on catalytic processes for the production of alkylate. Catalysts used in industrial alkylations have typically been strong liquid acids, such as sulfuric acid and hydrofluoric acid. Other strong acids have been used in laboratory or industrial alkylations. These acids include aluminum trichloride, and super acids such as trifluoromethanesulfonic acid.

In addition to problems related to undesired polymerization and side-reactions, liquid acid alkylation requires the use of a fairly concentrated acid and the replacement of consumed acid. For example, sulfuric acid concentration is controlled above 90% to provide optimum activity and selectivity, and hydrofluoric acid concentration is maintained in the range of 85–95%. These acids, however, are recognized hazardous materials, whose use requires the adoption of periodic hazard reviews of the operating units and the implementation of safety procedures and measures to minimize the probability of accidental releases. Other typically costly measures that must be adopted include control operations to mitigate the detrimental effects of such possible accidents.

Another drawback of the use of liquid acid catalysts is the disposal of sludge formed during alkylation. This waste sludge that is produced by sulfuric acid or hydrofluoric acid catalyzed alkylations is subject to stringent environmental regulations. The regulated waste management operations for the disposal of this sludge add considerable expenses to commercial alkylation.

The residue known as "red oil" is another product derived form liquid acid catalysis that presents disposal and recycling problems. Red oil is predominantly the conjugation product of an acid and alkylate that has to be disposed of, or recycled. Disposal presents a problem that is inherent in the storage, handling and deposit of hazardous substances. Further, recycling is also an expensive operation because it requires the implementation of additional processes that significantly increase the cost of producing the desired alkylate.

The handling and disposal problems associated with liquid acid alkylation catalysts cause technological developments in alkylations to be greatly influenced by environmental considerations. One reason is that modern low emission gasoline formulations rely heavily on alkylate. Furthermore, as noted in the foregoing discussion, the use of liquid acid alkylation catalysts requires a constant improvement of process safety, the reduction of waste disposal, and the limitation of the environmental consequences of any process emissions. In addition, liquid acid catalysis employing sulfuric acid or hydrofluoric acid is not an effective means for catalyzing certain alkylations, such as the alkylation of benzene with ethylene.

It is therefore desirable to provide alkylation catalysts which can be used in the production of low emission fuels, which are noncorrosive and easy to handle, and which can be effectively reactivated to avoid disposal problems. Because solid acid catalysts are easier to handle and less hazardous than liquid acid catalysts, they are good candidates to replace liquid acid alkylation catalysts. However, solid catalysts are known to deactivate relatively rapidly as a consequence of fouling of the active sites by heavy reaction intermediate products and byproducts. This is considered a major hurdle for the effective use of solid acid alkylation catalysis. See Kirk-Othmer, Encyclopedia of Chemical Technology, Vol.2, p.92, 4th ed. (1991). Rapid deactivation of solid acid catalysts leads to relatively large volumes of material that must be discarded. Disposal of such material introduces a host of complications, such as environmental issues and the like. See id., p. 108. Consequently, it is particularly desirable to provide solid acid alkylation catalysts which can be handled easily, and which can easily be reactivated to an active condition so that they can be used effectively in further alkylation reactions.

Because alkylation reactions typically take place in a fluid medium, the use of solid acid catalysts is also referred to as heterogeneous catalysis.

Heterogeneous Catalysis

The term "catalyst" as used herein includes any solid catalyst with sufficient strength to carry out alkylations. A large number of alkylation catalysts have been proposed, including molecular sieves, and in particular zeolites, silicates, aluminophosphates, and silicoaluminophosphates. Alkylation catalysts can be chosen from among a variety of substances, with the specific catalyst often determined by the character of the processes carried out in the plant where the alkylation takes place.

Zeolites, which can be natural, synthetic or mixtures thereof used as catalysts in alkylations include ZSM-4, ZSM-3, ZSM-5, ZSM-20, ZSM-18, ZSM-12, ZSM-35, ZSM-48, ZSM-50, MCM-22, PSH-3, TMA offretite, TEA mordenite, REY, faujasites comprising zeolite Y and mordenite, ultrastable Y zeolites (USY), and a number of zeolites such as zeolite beta, zeolite Omega, zeolite L, and clinoptilolite, and rare-earth metal containing forms of zeolites. Other catalysts include at least one among a variety of inorganic oxides such as alumina, and in particular η or γ alumina, silica, boria, phosphorous oxides, titanium dioxide, zirconium dioxide, chromia, zinc oxide, magnesia, calcium oxide, silica-alumina, silica-magnesia, silica-alumina-magnesia, silica-alumina-zirconia, sulfated mixed-metal oxides, and more generally a variety of refractory inorganic oxides and natural substances such as bauxite, clay, including kaolin and bentonite, and diatomaceous earth. Molecular sieves that also catalyze alkylations include pillared silicates and/or clays, aluminophosphates such as ALPO-5 and VPI-5; silicoaluminophosphates such as SAPO-5, SAPO-37, SAPO-3 1, SAPO-40, and SAPO-41,other metal aluminophosphates, and layered materials such as MCM-36.

These catalysts, alone or in combination among themselves or with other substances are known to be used in alkylations of olefins and aromatic hydrocarbons. For example, one of the non-zeolitic substances that can be combined with zeolites in the preparation of alkylation catalysts is at least one Lewis acid, such as boron trifluoride, antimony pentafluoride, and aluminum trichloride. Refractory oxides can be used in combination with other catalytic substances to provide temperature resistance. In addition, diluent materials such as various oxides and clays can be incorporated to control the conversion rate, to improve the catalyst's mechanical properties, to provide a matrix material, and/or to act as catalyst binders. Other active substances, for example platinum and/or palladium, can also be incorporated into alkylation catalysts to provide a metal hydrogenation function. Other catalysts capable of catalyzing alkylation can be produced by the deposition of agents covalently bound to, or entrained in, polymers on a solid surface not generally capable or poorly capable of catalyzing alkylation.

Various references that provide guidance in the composition, preparation/obtention and use of such catalysts are known. In this respect, reference in made to U.S. Pat. Nos. 5,491,277; 5,489,732; 5,345,028; and 5,304,698. The disclosures of these patents are incorporated by reference herein.

Solid alkylation catalysts affect alkylation kinetics. However, an alkylation catalyst does not effectively modify alkylation kinetics when at least one of a variety of conditions is satisfied. For example, an alkylation catalyst is not effective when, despite being in the presence of the alkylation reactants at the appropriate thermodynamic reaction conditions, the catalyst is deactivated. In another example, an alkylation catalyst does not effectively modify alkylation kinetics when the catalyst is under conditions such that not all of the alkylation reactants are available. Conditions in which not all of the alkylation reactants are present for the alkylation to take place will hereinafter be referred to as "the absence of alkylation."

Reactants, intermediate reaction species, and alkylates of a variety of sizes and shapes can participate in a variety of alkylations. The shape and size selectivity of the zeolite is directly related to the shape and size of the channels in the zeolite. Accordingly, selection of the appropriate zeolite for any given alkylation will be determined by its structural characteristics. Structure, dimensions and pore characteristics of zeolites are provided in numerous sources, such as J. A. Martens, et al., Estimation of the void structure and pore dimensions of molecular sieve zeolites using the hydroconversion of n-decane, Zeolites 4, 98 (1984); W. Hölderich, et al., Industrial application of zeolite catalysts in petrochemical processes, Ger. Chem. Eng. 8, 337 (1985); W. Hölderich, et al., Zeolites: Catalysts for organic syntheses, Angew. Chem. Int. Ed. Engl. 27, 226 (1988); S. M. Csicsery, Catalysis by shape selective zeolites—Science and technology, *Pure & Appl. Chem.* 58(6), 841(1986); W. Meier, et al., Atlas of zeolite structure types (1988). For example, zeolite A, erionite, and chabazite are classified as small-pore zeolites; medium-pore zeolites include zeolites ZSM-5, ZSM-11, ZSM-22, ZSM-23, ZSM-48, NU-10, Theta 1, TS-1, and sihealite; and large-pore zeolites comprise faujasite, X-zeolite, Y-zeolite, mordenite, offretite, zeolite L, zeolite Omega, zeolites ZSM-4, ZSM-12, and zeolite Z.

Although the availability and properties of a variety of alkylation catalysts for heterogeneous catalysis have been known for some time, the deactivation of most of these catalysts remains a problem. A number of attempts to solve or ameliorate aspects of the catalyst deactivation problem have been made.

Catalyst Deactivation Problem

U.S. Pat. Nos. 4,605,811 (hereinafter the "'811 patent") and 4,721,826 (hereinafter the "'826 patent") disclose a process for restoring or maintaining the activity of heterogeneous catalysts for reactions at normal and low pressures. Catalyst activity is restored or maintained by using a pressure greater than the critical pressure of the fluid phase and a temperature higher than or equal to the critical temperature of the fluid phase. The process disclosed in these patents includes the reactivation of the catalyst at a pressure and temperature that are in the supercritical region of the reaction medium phase diagram. This requirement limits the range of substances that can be chosen to regenerate the catalyst, because the critical pressure and temperature must be within the pressure and temperature ranges for which the reaction conditions have been optimized, otherwise the reaction would proceed less efficiently or it would even not take place significantly. Furthermore, the substance that regenerates the catalyst must be compatible with the reactants and products because reactivation takes place while the chemical reaction proceeds. Reported times for catalyst reactivation according to the processes disclosed in the '811 and the '826 patents include 24 hours and 75 hours.

U.S. Pat. No. 5,304,698 (hereinafter the "'698 patent") discloses a solid catalyzed supercritical isoparaffin-olefin alkylation process. The alkylation conversion conditions of this process include temperature and pressure that are, respectively, at least equal to the critical temperature and critical pressure of the component of highest concentration in the feed stock. These conditions are maintained over the entire course of the reaction until the catalyst is completely deactivated. The '698 patent does not disclose how to regenerate a completely deactivated catalyst. Furthermore, the isoparaffin containing feed is not to be contacted with the catalyst according to the process disclosed in the '698 patent under pressure and temperature conditions below the critical temperature and critical pressure of the isoparaffin component of highest concentration in the feed. The '698 patent teaches the use of conditions under which the component of highest concentration in the feed, being kept under supercritical conditions, prolongs the useful catalytic life of the crystalline microporous material through properties and behavior attributed to such component under supercritical conditions.

U.S. Pat. No. 5,310,713 discloses a process for regeneration of an alkylation catalyst with hydrogen. This process requires reactivation with hydrogen gas that can be mixed with liquid isobutane as a solvent. U.S. Pat. No. 5,491,277 (hereinafter the "'277 patent") discloses a mixed-phase solid bed hydrocarbon alkylation process where "the exact manner of regeneration does not form . . . [part of] the process but is expected to include 'washing' of the catalyst with a liquid phase hydrocarbon such as isobutane or benzene, possibly at an elevated temperature and in the presence of some hydrogen to remove carbonaceous deposits." Col. 6, ll. 28–33. The regeneration procedure disclosed in the '277 patent requires the presence of hydrogen with liquid isobutane that is supplied at a temperature of 100–150° C. as a solvent.

U.S. Pat. No. 5,489,732 discloses a fluidized solid bed motor fuel alkylation process in which the solid acid catalyst is continuously regenerated by removing it from the reactor and contacting it with hydrogen. In the first regeneration step, the hydrogen is dissolved in feed hydrocarbon and the catalyst is mildly regenerated. In the second regeneration step, the catalyst is separated from the liquid phase and regenerated with gaseous hydrogen at a temperature in the range 80–500° C. (preferably 100–250° C.). The regenerated catalyst is then fluidized with 38° C. isobutane and reintroduced to the bottom of the reactor. The average residence time of the regenerating catalyst in the liquid-phase hydrocarbon zone is 0.5–15 min, and the temperature and pressure in this zone are very near the reaction conditions for the alkylation.

The patents and other publications cited hereinabove are incorporated herein by reference in their entirety.

Catalyst Reactivation

The term "catalyst reactivation" will hereinafter be used to encompass catalyst regeneration and also catalyst reactivation. Catalyst reactivation refers to the treatment of a catalyst that renders it into a form in which it is suitable for its efficient use or re-use as a catalyst. "Reactivating agent" will hereinafter refer to a substance or mixture of substances that is used in catalyst reactivation.

The foregoing discussion indicates that it is highly desirable to provide heterogeneous catalysis that effectively replaces liquid acid catalysis in alkylation reactions. However, solid acid catalysts present problems associated with the catalyst's longevity and alkylate product quality.

Fouling substances that are generated in the alkylation process or that are introduced with the feed in the alkylation process fairly quickly reduce the number of the catalyst's active sites. Catalytic site reduction leads in turn to a reduction of the alkylation efficiency to a point such that the alkylation no longer takes place to any significant extent. Deactivated catalyst disposal would impose heavy burdens, such as those associated with waste disposal regulation compliance and the costs of resupplying the spent catalyst.

Methods employing supercritical fluids that are directed to the extension of the useful life of catalysts have not addressed the need to reactivate catalysts that have become deactivated. Furthermore, proposed methods for prolonging the longevity of alkylation catalysts rely on the maintenance of supercritical temperature and pressure conditions throughout the alkylation. This is a requirement that imposes a variety of limitations on the alkylation process, including a limited choice of reactivating agents and the possibly inefficient running of the alkylation.

According to one alkylation strategy, the temperature and pressure of alkylation conditions must be within narrow limits to procure the optimal thermodynamic and kinetic conditions and to avoid undesired byproducts and additional fouling agents. In those cases at least, the choices for the reactivating agent are typically very limited. Furthermore, only a very reduced number of substances that do not actually participate in the alkylation itself may have a critical pressure and a critical temperature that fall within the optimal pressure and temperature reaction conditions.

According to another strategy, the alkylation is run at a temperature and pressure high enough that they are within the supercritical conditions of at least one of the reactants. This reactant is then assigned the function of removing fouling agents and thus prolonging the longevity of the catalyst as an effective alkylation catalyst. However, the required critical pressure and critical temperature might be so high that they are detrimental to the alkylate quality. For example, such temperature and/or pressure conditions may favor undesirable side reactions, such as isomerizations, product cracking, olefin oligomerization, and coking, which might predominate over the desired alkylation. Product quality and high octane product yield are then significantly reduced. In addition, some of the undesired side reactions might contribute to the additional build up of fouling agents, thus aggravating the problem that was to be solved.

According to still another strategy, the alkylation catalyst is transferred out of the reactor for its total or partial reactivation. Reactivation is then accomplished by processes such as calcination, treatment with solvents, and elution with substances that dissolve and/or react with the fouling agents. The implementation of this strategy requires the substantial modification of reactor equipment or the complete removal and replacement of catalyst batches.

It would thus be desirable to provide a catalyst reactivation process that can rely on a substance that contains at least one of the alkylation reactants as reactivating agent, or some other substance that can be used as reactivating agent without detrimentally affecting the alkylation itself.

It would also be desirable to provide a catalyst reactivation process that can be carried out independently of the alkylation itself to reactivate a partially or totally deactivated catalyst under conditions such that the alkylation itself is not detrimentally affected. Furthermore, it would be desirable to provide a catalyst reactivation process that can effectively reactivate the catalyst regardless of the optimal pressure and temperature conditions at which the alkylation is run.

This reactivation process should rely on a reactivating agent that removes fouling agents by reacting with and dissolving them. In this way, the process' reactivating ability is considerably enhanced with respect to the reactivating ability of those processes that rely on the mere dissolution of certain fouling agents in the medium that extends the catalyst's useful life.

SUMMARY AND OBJECTS OF THE INVENTION

An object of the invention is to provide methods and systems for reactivating solid alkylation catalysts.

A further object of the invention is to provide methods and systems in which solid alkylation catalyst reactivation occurs whether the catalyst is partially or completely deactivated.

To achieve the foregoing objects, and in accordance with the invention as embodied and broadly described herein, a method is provided for solid alkylation catalyst reactivation that comprises contacting a catalyst that is partially or even completely deactivated with a fluid reactivating agent. This contacting is performed under pressure and temperature conditions such that the fluid reactivating agent is in the form of a dense fluid under any one of a variety of conditions, including near-critical, critical and supercritical conditions. These conditions permit the advantageous use of the desirable solvent properties and the desirable transport properties of the fluid reactivating agent. Solvent properties facilitate the surface removal of fouling agents and the products of any reaction between the reactivating agent and the fouling agents, which in turn leads to an efficient and fast reactivation process. Transport properties facilitate the diffusion of fouling compounds out of the catalyst, thus improving the rate and extent of regeneration.

One of the features of the fluid reactivating agent used in the methods of this invention is that it can react with the fouling agents and dissolve some fouling agents as well as the products of the reaction between the fluid reactivating agent and fouling agents. An advantage of this feature is that it permits faster and more complete catalyst reactivation because of the more intense removal of catalyst fouling agents.

The methods of this invention are effectively implemented to reactivate a solid catalyst, whether the catalyst is within or outside the alkylation reactor. This feature advantageously enhances the versatility of the methods of the present invention because they can be implemented in a great variety of alkylation reactors. Furthermore, the ability to reactivate a solid catalyst inside the alkylation reactor advantageously diminishes the duration and complexity of catalyst reactivation.

Solid catalysts can be reactivated according to this invention under a variety of conditions, which may or may not be close to the alkylation conditions. This feature further enhances the versatility of the methods of the present invention because solid catalyst reactivation can be accomplished without imposing constraints that could be detrimental to the optimal thermodynamic and/or kinetic alkylation conditions.

An additional feature of this invention is that the fluid reactivating agent can be chosen to be one of the alkylation reactants. This feature advantageously renders solid catalyst reactivation according to this invention relatively simple and cost effective. The simplicity is derived from the fact that a minimal number of chemical species are required for alkylation and catalyst reactivation. Cost effectiveness derives from the reduced physical conditions and technical demands of a catalyst reactivation process which does not require chemical species in addition to those used in the alkylation process.

The fluid reactivating agent can be optionally recovered and recycled after catalyst regeneration so as to be incorporated into the alkylation reactant feed and/or into the fresh reactivating agent flow. The recovered fluid reactivating agent can be used directly with olefin addition in the alkylation feed stream, or recycled back to the inlet stream of the reactivating catalyst reactor, in each case reducing the amount of reactivating agent needed. This feature advantageously increases the cost effectiveness of catalyst reactivation according to the invention because of the derived savings in materials.

The catalyst reactivation methods of the invention provide the advantage that deactivated catalysts do not have to be immediately disposed of, but can instead be used in a plurality of catalytic cycles.

These and other objects, features, and advantages of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

C., 1600 psig, for 2 hours, with 33 g isobutane (g catalyst)$^{-1}$ h$^{-1}$. The reactivation criterion was alkylation run time of exactly 3 hours.

Figure 16:
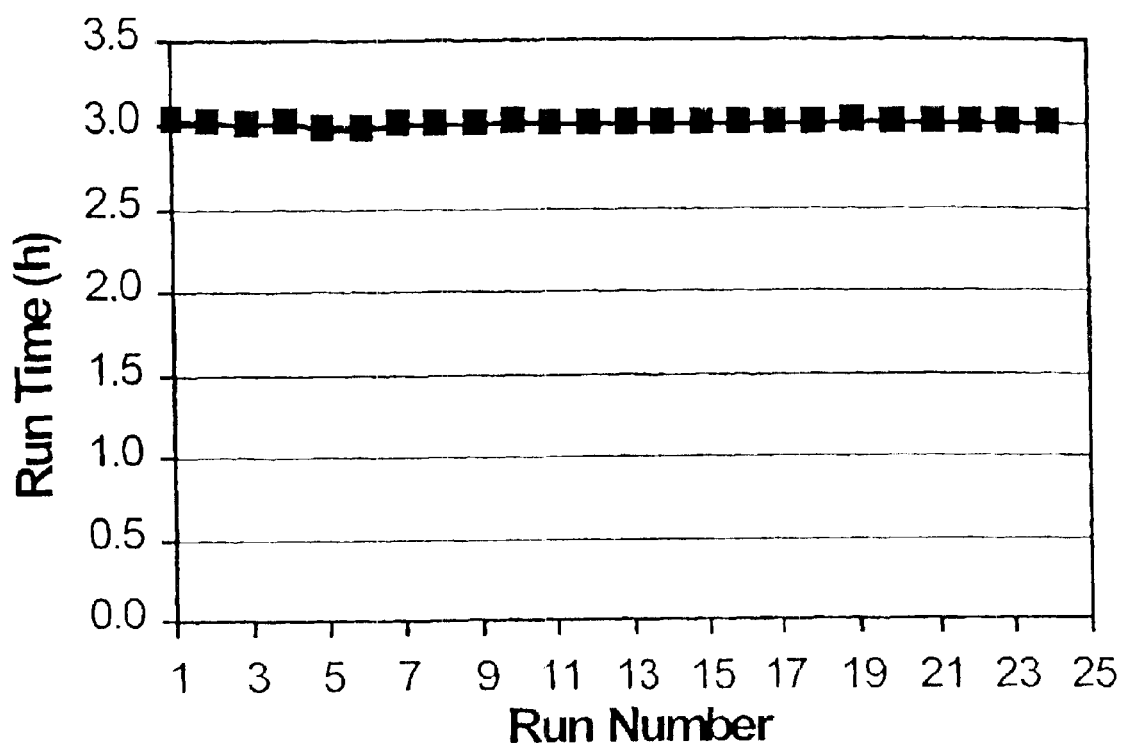

FIG. 16 shows the run times (exactly 3 h per alkylation run) with each successive run (after being reactivated) for the multiple reactivation experiment in the recycle reactor at an OWHSV of 0.2 g trans-2-butene (g catalyst)$^{-1}$ h$^{-1}$.

Figure 17:
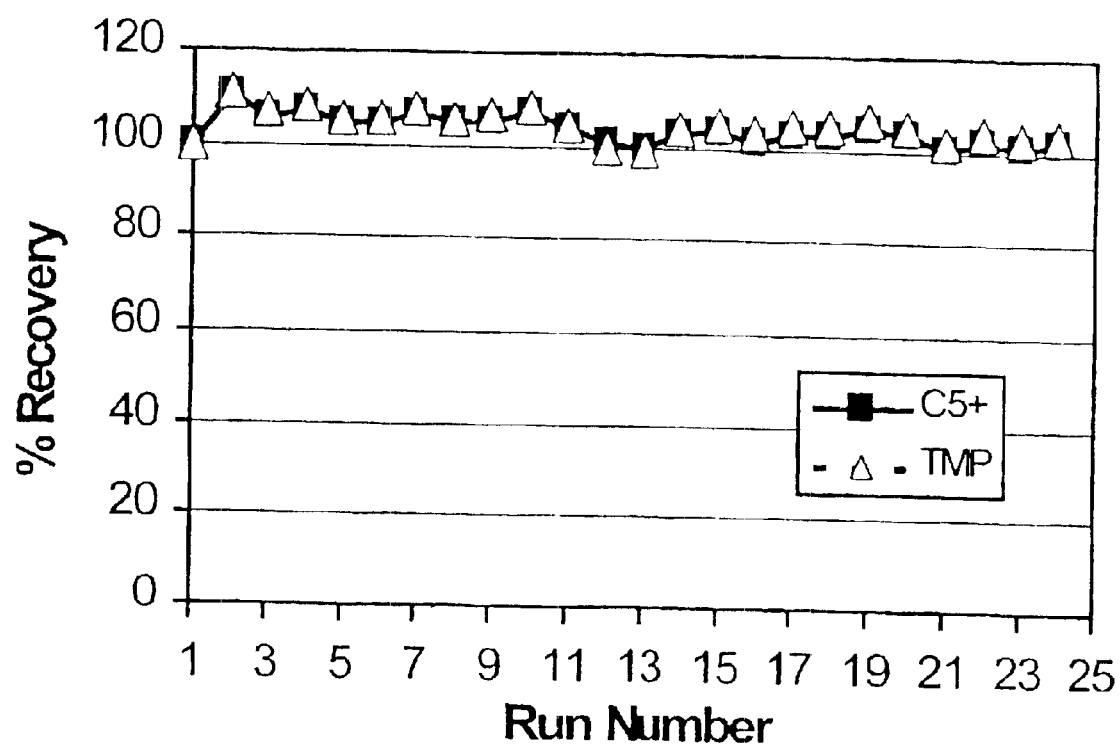

FIG. 17 shows the change in percentage of recovered alkylate (C5+) and trimethylpentane (TMP) production with each successive run (after being reactivated) for the multiple reactivation experiment in the recycle reactor at an OWHSV of 0.2 g trans-2-butene (g catalyst)$^{-1}$ h$^{-1}$, with 3 h of alkylation as the reactivation criterion. Values are compared with the initial run (100%).

Figure 18:
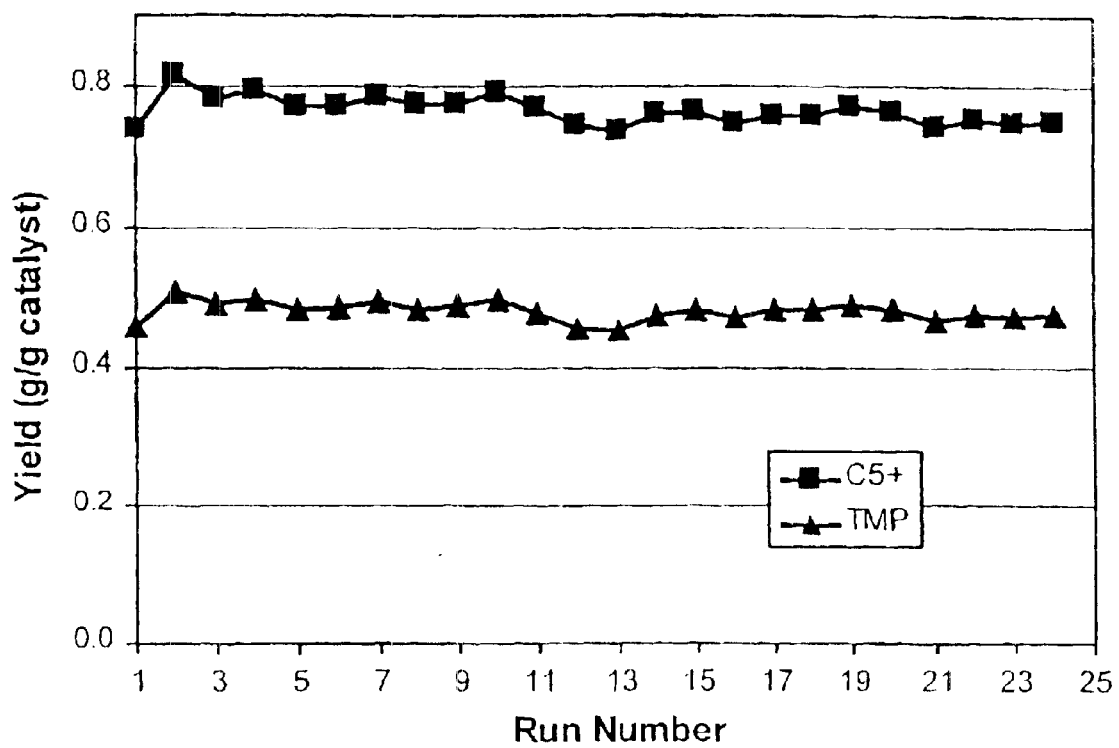

FIG. 18 shows total alkylate (C5+) and trimethylpentane (TMP) yields in each successive run (after being reactivated) for the multiple reactivation experiment in the recycle reactor at an OWHSV of 0.2 g trans-2-butene (g catalyst)-$^{-1}$ h$^{-1}$, with 3 h of alkylation as the reactivation criterion.

Figure 19:
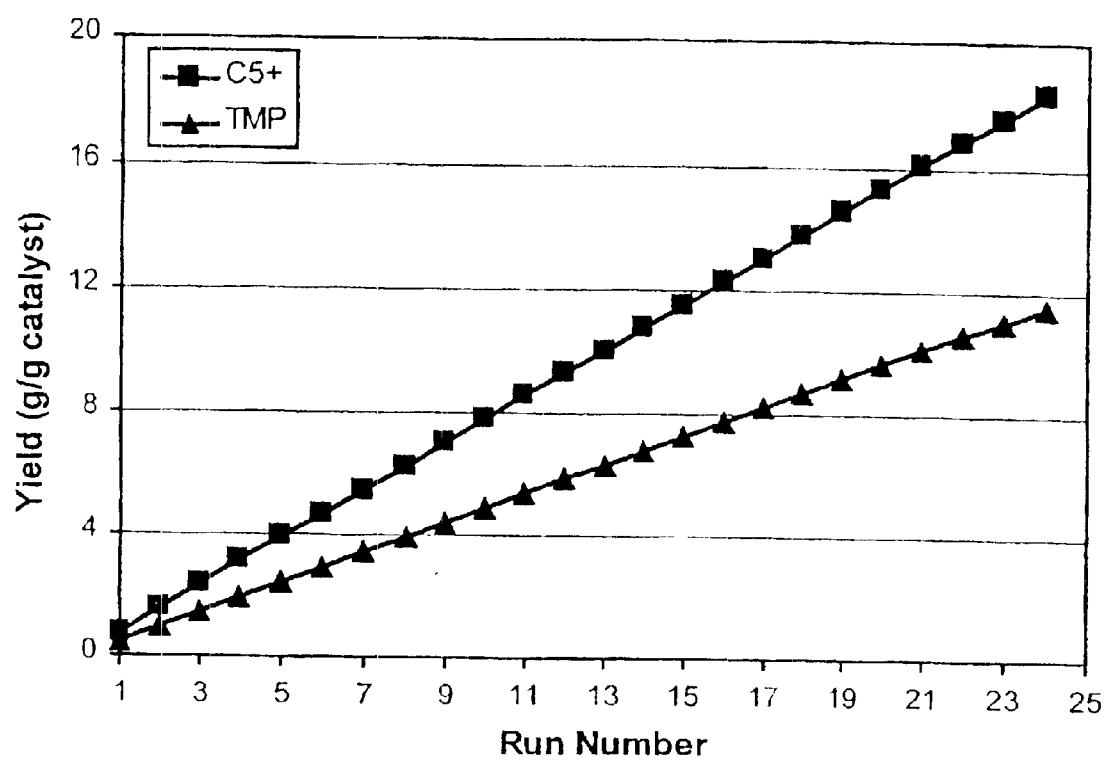

FIG. 19 shows the variation of cumulative alkylate (C5+) and trimethylpentane (TMP) yields with run number for the complete multiple reactivation experiment in the reactor at an OWHSV of 0.2 g trans-2-butene (g catalyst)$^{-1}$ h$^{-1}$, with 3 h of alkylation as the reactivation criterion.

Figure 20:
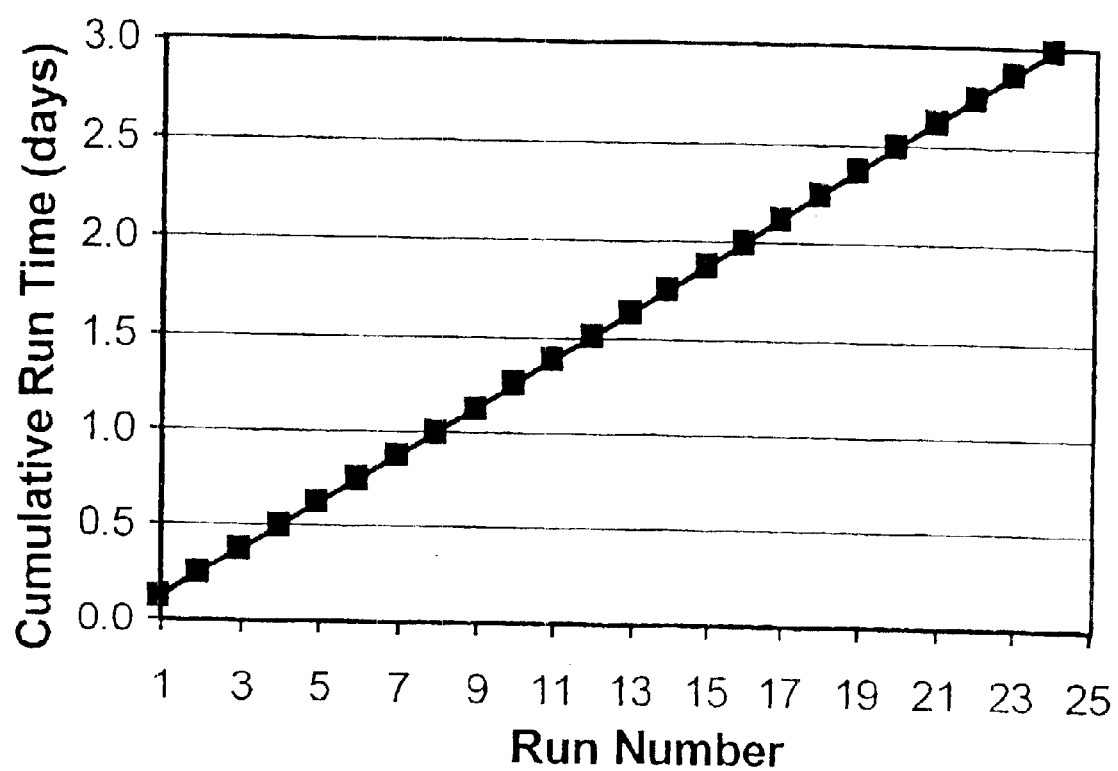

FIG. 20 shows the cumulative run time with run number for the complete multiple reactivation experiment in the recycle reactor at an OWHSV of 0.2 g trans-2-butene (g catalyst)$^{-1}$ h$^{-1}$, with 3 h of alkylation as the reactivation criterion.

DETAILED DESCRIPTION OF THE INVENTION

The present invention is directed to methods and systems for reactivating a partially or totally deactivated solid alkylation catalyst in such a way that the optimal pressure and temperature of alkylation conditions do not have to be altered to accommodate the reactivation process. The catalyst may be kept within the alkylation reactor during both the alkylation and reactivation processes, or may be removed for the reactivation, depending on the particular piping and mechanical configuration employed. Catalyst reactivation according to this invention is accomplished by contacting the partially or totally deactivated catalyst with a fluid reactivating agent that can dissolve the fouling agents that deactivate the catalyst. The reactivating ability of the fluid reactivating agent of this invention is enhanced because the fluid reactivating agent is chosen so that it reacts with the fouling agents that deactivate the catalyst in a way that enhances desorption of the fouling agent from the catalyst surface, at or away from the reactive site. Removal of the reactivating fluid with the fouling agents and products of the reaction of the fluid reactivating agent with the fouling agents leads to a reactivated catalyst that can effectively be reused in subsequent alkylations.

The reactivation methods according to the present invention do not interfere with the alkylation itself. In some embodiments of the present invention, reactivation is performed while no alkylation takes place in the reactor that contains at least a partially deactivated catalyst. In other embodiments of the present invention, the reactivation is performed while the catalyst is outside the reactor compartment in which alkylation takes place.

Reactivation of the catalyst outside the alkylation reactor is performed analogously as reactivation is carried out when the catalyst is within the alkylation reactor. However, reactivation of the catalyst outside the reactor involves the additional operations of removing the catalyst from and reinserting it into the reactor.

Reactivation of the catalyst in the reactor while no alkylation takes place is preferably accomplished according to this invention with a swing column system that permits the controlled and independent direction of the flow of alkylation reactants and the flow of fluid reactivating agent. A schematic depiction of a swing column system 10 is shown in FIGS. 1A–1B.

Figure 1A:
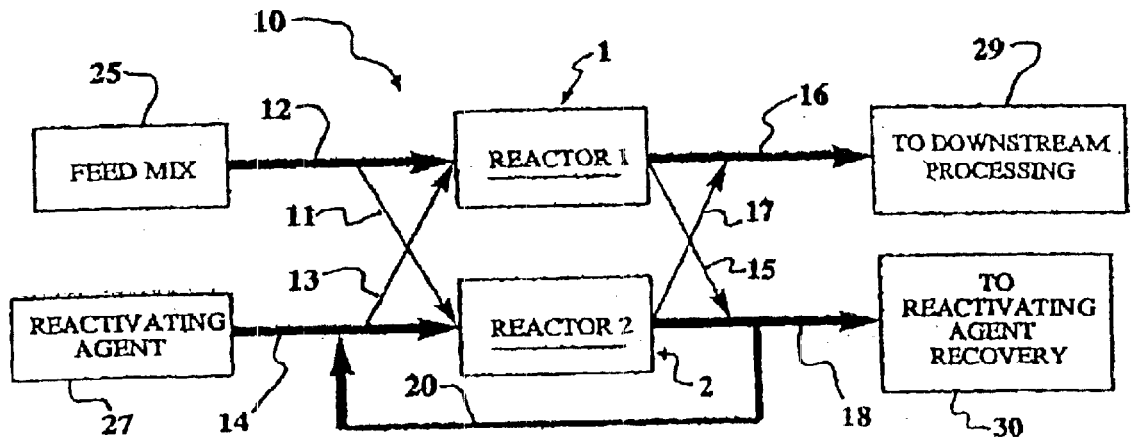
FIG. 1A schematically shows an embodiment of a two-column system in which the catalyst in reactor 2 is reactivated whereas alkylation takes place in reactor 1.
Figure 1B:
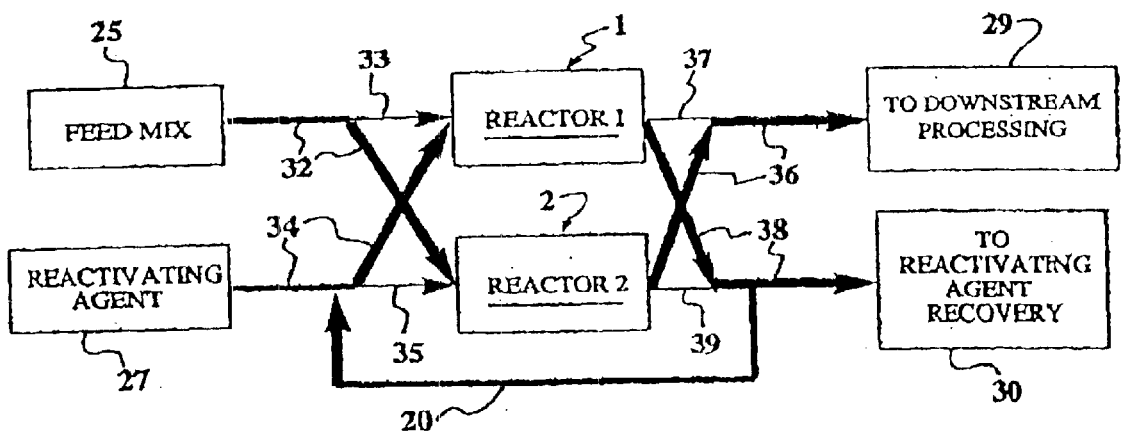
FIG. 1B schematically shows an embodiment of a two-column system in which the catalyst in reactor 1 is reactivated whereas alkylation takes place in reactor 2.

The embodiment of the swing column system shown in FIGS. 1A–1B can be extended to any number of reactors, even though the embodiment shown in FIGS. 1A–1B is depicted as a two-column system for the sake of simplicity and clarity. Implementation of the principles described herein regarding swing column systems can be extended to any number of reactors by one of ordinary skill in the art.

The diagrams in FIGS. 1A–1B show reactors 1 and 2 which are embodied by any model of suitable alkylation reactors. The reactors 1 and 2 are an example of means for holding at least one solid alkylation catalyst. It will be understood by those skilled in the art that a variety of reactor configurations may be utilized to accomplish this function.

Active flow lines in the embodiments sketched in FIGS. 1A–1B are represented by the thicker arrows. These active flow lines comprise lines 12, 14, 16, 18, and 20 in FIG. 1A, and lines 32, 34, 36, 38, and 20 in FIG. 1B. Closed lines through which no flow is intended to circulate are represented in FIGS. 1A–1B by thinner lines. These closed lines comprise lines 11, 13, 15, and 17 in FIG. 1A, and lines 33, 35, 37, and 39 in FIG. 1B.

Feed mix 25 comprises the alkylation reactants. This feed mix is supplied in the embodiment shown in FIG. 1A to one reactor whereas fluid reactivating agent 27 is supplied to another reactor, which contains at least partially deactivated alkylation catalyst. In the embodiment shown in FIG. 1A, feed mix 25 is supplied to reactor 1 whereas fluid reactivating agent 27 is supplied to reactor 2. Catalyst in reactor 1 is active enough as to be able to effectively catalyze alkylation with feed mix 25 supplied through active flow 12. The alkylate obtained thereby is transported by active flow 16 to downstream processing 29.

Fluid reactivating agent 27 is supplied through active flow line 14 in the embodiment shown in FIG. 1A to reactor 2 which contains at least partially deactivated alkylation catalyst. The active flow line 14 with associated pumping devices is an example of means for directing a fluid reactivating agent toward the catalyst. It will be understood by those skilled in the art that a variety of configurations and devices may be utilized to accomplish this function.

The catalyst is reactivated by the fluid reactivating agent which dissolves the fouling agents deposited in the catalyst and also reacts with some fouling agents to enhance the reactivation. A means for generating pressure and temperature conditions while the catalyst is in contact with the fluid reactivating agent in the absence of alkylation is provided such that the fluid reactivating agent is dense enough to dissolve impurities and is a near-critical gas or near-critical liquid, or is at or above the critical point. It will be understood by those skilled in the art that a variety of pressure and temperature control devices can be utilized to generate the optimum pressure and temperature conditions during catalyst regeneration.

The fluid reactivating agent, along with dissolved fouling agents and the products of the reaction of the fluid reactivating agent with fouling agents, are transported through line 18 to fluid reactivating agent recovery processing with the option of recirculating such flow through line 20 back into reactor 2.

Because no alkylation takes place in reactor 2 while its catalyst is being reactivated, the reactivating conditions in reactor 2 can be chosen to optimize the reactivation process without interfering with the actual alkylation that takes place in reactor 1 and in any other additional reactor (not shown in FIG. 1A). Catalyst reactivation according to this embodiment can be performed at any desired stage in any cycle of the catalyst's performance. For example, alkylation can be run in reactor 2 until the catalyst contained therein is completely deactivated, or it can be run only up to the stage where the catalyst is deactivated to a determined extent.

When the catalyst in reactor 1 needs reactivation and the catalyst in reactor 2 is ready to effectively catalyze alkylation, the operation is performed as schematically shown in FIG. 1B. Feed mix 25 in FIG. 1B is supplied to reactor 2 through active flow 32, whereas fluid reactivating agent 27 is supplied to reactor 1 through active flow 34. The alkylate obtained in reactor 2 is transported through line 36 to downstream processing 29. On the other hand, the fluid reactivating agent, along with dissolved fouling agents and the products of any reaction of fouling agent with the fluid reactivating agent from reactor 1, are transported by active flow 38 to fluid reactivating agent recovery 30. Optionally, such flow can be recirculated through line 20 in reactor 1.

The number of reactors in the swing column system is chosen according to the relative duration of each of the alkylation and reactivation processes in the different reactors. For example, when catalyst reactivation is completed before the alkylation catalyst has become deactivated to an unacceptable extent, a plurality of alkylation reactors can be maintained in the swing column system while the catalyst in only a single reactor is being reactivated.

The alkylation reaction and reactivation process of the present invention can take place at the same pressure. Alkylation can take place at lower temperatures where the highly branched trimethylpentane products are favored. During catalyst reactivation, the temperature can be increased to optimize the removal of catalyst fouling agents. Reducing pressure swings simplifies flow processes, improves reliability, and reduces operating costs of a commercial unit.

The methods of this invention can be used to reactivate an alkylation catalyst regardless of the reactor type that is used for the actual alkylation process. In addition to swing-column reactors, the methods of this invention can effectively be used to reactivate alkylation catalysts in conjunction with a variety of other reactor types as well. Such reactor types include, but are not necessarily limited to, packed bed systems, and systems where the catalyst is physically moved through alkylation and reactivation zones within a single reactor or among several separate reactors, such as in continuous stirred tank reactors (CSTR). For example, when continuous stirred tank reactors are utilized, one reactor can provide a reactivation zone for catalyst regeneration and another reactor can provide an alkylation zone for performing alkylation reactions, with the catalyst physically moved therebetween.

In any reactor type, the methods of this invention could be implemented in conjunction with partial or total recycle of the reactivating reactor effluent to the reactor inlet.

It is believed that catalyst fouling agents include long chain hydrocarbons which have low volatility and high molar mass. Because of their low volatility, these fouling agents do not evaporate easily. Furthermore, these fouling agents diffuse poorly through the catalyst's pores because of their high molar mass.

The mechanism whereby the fluid reactivating agent of this invention effectively removes fouling agents from the catalyst is most likely complex. However, it is believed that the fluid reactivating agent may remove fouling agents according to this invention by a process that includes the reactive release of the fouling agents from the catalyst. It is believed that fouling agents are deposited at the catalyst's active sites in the form of carbocations that interact with the catalyst's active sites. A fluid reactivating agent such as isobutane may lead to hydride transfer to the high molecular weight carbocation and its subsequent release from the catalyst active sites. The isobutane in turn forms a $C_4$-carbocation with the catalyst active site, activating the catalyst active site for subsequent alkylation once olefin is reintroduced to the reactor. This activation of the active site eliminates the induction period commonly seen with fresh alkylation catalyst, thus increasing the initial rate of the alkylation reactions.

The reactive aspect of the reactivating function performed by embodiments of the fluid reactivating agent of this invention is consistent with the results obtained from reactivation with He, and independently with n-pentane. Less than 35% of the completely deactivated catalyst's activity is recovered in these reactivation processes. These percentages of recovery of less than 35% are believed to be due to high temperature cracking and volatilization or solubilization of the fouling agents by the fluid reactivating agent, such as He or n-pentane. In contrast, up to 83% of the completely deactivated catalyst's activity can be recovered with a fluid reactivating agent according to this invention, such as supercritical isobutane. These results indicate that mere cracking and subsequent volatilization or dissolution of the fouling agents do not lead to the high reactivation effects achieved by embodiments of the present invention.

Some conventional processes for treating catalysts rely on an initial washing of the deactivated catalyst with liquid isobutane, and subsequently these processes rely on a gas such as hydrogen, typically in the presence of at least one metal such as Pt, Pd, and Ni, to reactivate the catalyst. Isobutane is an embodiment of a fluid reactivating agent according to the present invention, and it is relied on for the primary reactivating function. Furthermore, a fluid reactivating agent according to this invention can optionally be mixed with at least one gas, such as hydrogen or oxygen, because the fluid reactivating agent under supercritical conditions dissolves such gas. The added gas or a mixture thereof supplements then the reactivating effects of the fluid reactivating agent of this invention. Embodiments of this invention that include a gas dissolved in the fluid reactivating agent are preferably used in the presence of at least a metal such as Pt, Pd, and Ni.

Figure 2:
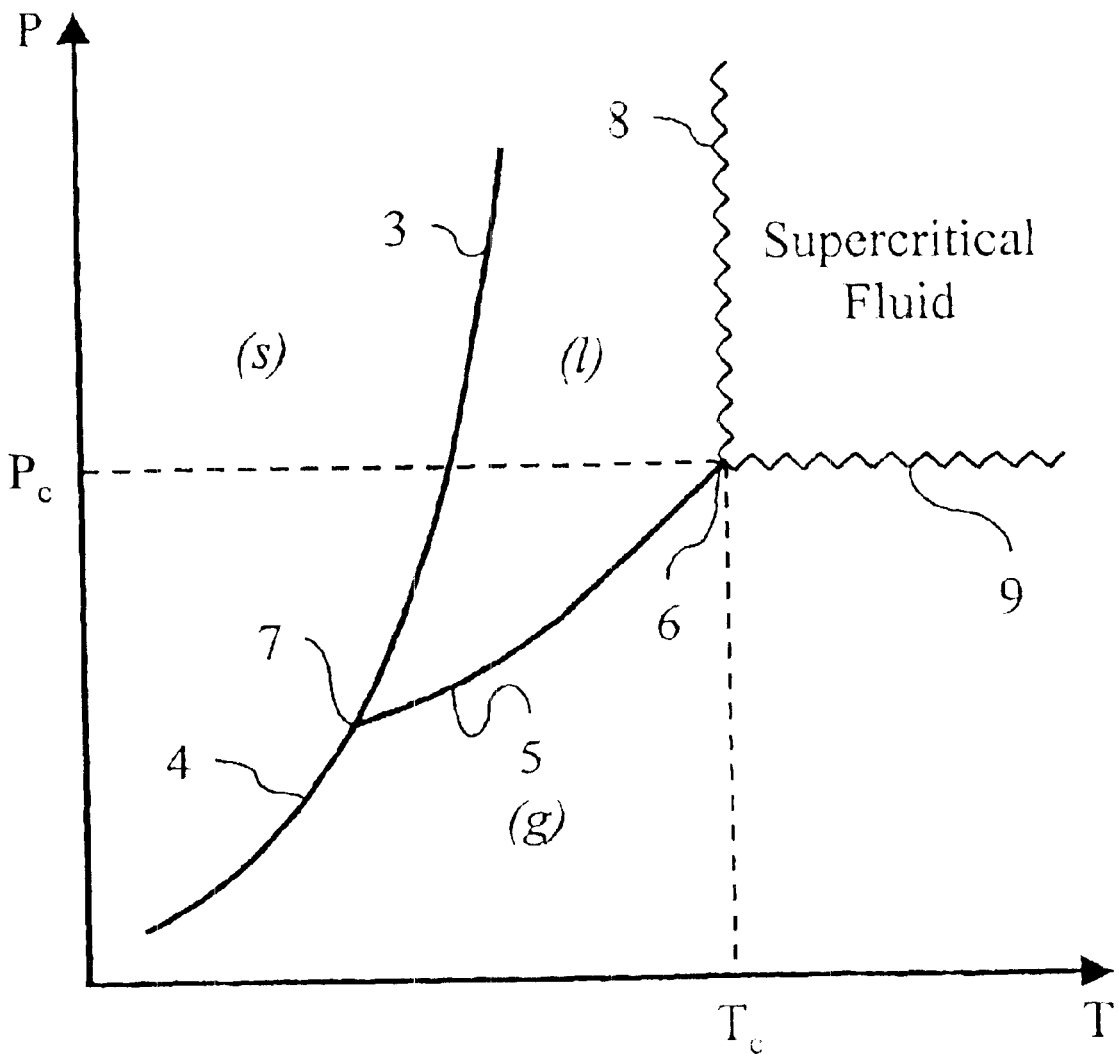
FIG. 2 schematically shows relevant features of a one-component system P-T phase diagram.

FIG. 2 schematically shows a one-component system phase diagram that is used hereinbelow to describe the pressure and temperature conditions for the catalyst reactivation methods according to this invention. It is understood that the phase diagram shown in FIG. 2 is merely a sketch representing qualitatively basic features of a phase diagram of a one-component system. This diagram is merely used for the purpose of introducing the terminology that will be adopted hereinbelow to characterize the pressure and temperature conditions at which the catalyst reactivation is performed according to the present invention.

Lines 3, 4 and 5 in the pressure (P)-temperature (T) diagram sketched in FIG. 2 represent respectively the solid-liquid, solid-gas and liquid-gas equilibrium lines. Point 7 is called the triple point and point 6 is called the critical point, which is defined by a critical pressure ($P_c$) and by a critical temperature ($T_c$).

The region to the right of the solid-liquid equilibrium line 3 and above the liquid-gas equilibrium line 5 for temperatures less than $T_c$ represents states of the fluid system which is in the liquid phase (l). The region to the right of the solid-gas equilibrium line 4 and below the liquid-gas equilibrium line 5 for temperatures below $T_c$ represents states of the fluid system which is in the gas phase (g). The region to the left of the solid-gas equilibrium line 4 and to the left of the solid-liquid equilibrium line 3 represents states of the system which is in a solid phase (s). Finally, the region for temperatures greater than $T_c$ and pressures greater than $P_c$ represents states of the fluid system that are supercritical. This supercritical region of the phase diagram is partially delineated with wavy lines 8 and 9 which are merely visual aids and which, in contrast with lines 3, 4, and 5, do not represent first order phase transitions. The term "near-critical" (NC) liquid is used herein to refer to all pressures corresponding to a liquid phase in the temperature range of about 0.9–1 $T_c$, where $T_c$ is referred to on an absolute temperature scale such as degrees Kelvin (K) or degrees Rankine (°R.). The term "critical" is used herein to characterize a pressure and a temperature that are equal to $P_c$ and $T_c$, respectively. The term "supercritical" is used herein to refer to a pressure and a temperature which are greater than $P_c$ and $T_c$, respectively, and "SCF" is used as an acronym for "supercritical fluid".

Characteristics of a supercritical fluid include transport properties that are more similar to those of a gas and density that is more similar to that of a liquid. For example, a supercritical fluid typically has a viscosity that is closer to that of a gas than to the liquid viscosity. High density is a desirable property when the fluid is utilized for dissolving other substances. The near-critical (NC) gas region of the phase diagram that is of interest in the context of this invention is the range of pressures and temperatures for a fluid which is dense enough as to effectively dissolve and/or transport catalyst fouling agents and the products of any reaction of the fluid reactivating agent with catalyst fouling agents, where an NC gas is defined as the fluid existing in its gas phase in the range of about 0.1–1 $P_c$, where $P_c$ is referred to on an absolute pressure scale, for temperatures at least about 0.9 $T_c$.

It has been discovered in the context of this invention that solid alkylation catalyst reactivation can be achieved by contacting the at least partially deactivated catalyst with a fluid reactivation agent at certain temperatures and pressures. These pressures and temperatures are such that the fluid reactivating agent is maintained fluid and dense enough so that the catalyst fouling agents and products of any reaction of fouling agents with the fluid reactivating agent can be dissolved in the fluid reactivating agent. The pressure should be such that the fluid reactivating agent is a dense fluid, such as a dense supercritical fluid, a dense critical fluid, a near-critical liquid, or a dense near-critical gas. The temperature should be such that the fluid reactivating agent's density has not decreased so much that the fluid reactivating agent can no longer effectively dissolve the catalyst fouling agents and products of any reaction of fouling agents with the fluid reactivating agent.

In terms of the critical temperature $T_c$ and critical pressure $P_c$ of the fluid reactivating agent, this is achieved within a temperature range that encompasses near-critical and critical temperatures, such as temperatures of at least about 0.9 $T_c$ and within a pressure range that encompasses near-critical and critical pressures, such as pressures that are at least about 0.1 $P_c$. The pressure should be sufficiently high within practical limits so that the fluid is dense enough to have the desired solvent properties at a given temperature.

In the context of the present invention the fluid reactivating agent is preferably at a pressure in the range of about 0.1 $P_c$ to about 10 $P_c$, more preferably about 0.9 $P_c$ to about 10 $P_c$, and most preferably about 1 $P_c$ to about 6 $P_c$; and at a temperature preferably in the range of about 0.9 $T_c$ to about 1.3 $T_c$, and more preferably about 0.95 $T_c$ to about 1.2 $T_c$.

When the pressure and temperature conditions are such that the fluid reactivating agent is a near-critical liquid, a pressure sufficient to maintain the fluid reactivating agent in a liquid phase is utilized, with a temperature of at least about 0.9 $T_c$, and preferably a temperature in the range of about 0.9 $T_c$ to about 1 $T_c$. When the pressure and temperature conditions are such that the fluid reactivating agent is a near-critical gas, the fluid reactivating agent is preferably at a pressure in the range of about 0.1 $P_c$ to about 1 $P_c$.

When the pressure and temperature conditions are such that the fluid reactivating agent is a critical fluid, the fluid reactivating agent is at a pressure equal to $P_c$ and at a temperature equal to $T_c$. When the pressure and temperature conditions are such that the fluid reactivating agent is a supercritical fluid, the fluid reactivating agent is at a pressure greater than $P_c$ and at a temperature greater than $T_c$. At supercritical conditions, the fluid reactivating agent is preferably at a pressure in the range of about 1 $P_c$ to about 8 $P_c$, and at a temperature preferably in the range of about 1 $T_c$ to about 1.3 $T_c$.

Wavy lines 8 and 9 in FIG. 2 indicate that the pressure and temperature conditions for the reactivating process according to the present invention do not necessarily have to be confined to the supercritical fluid region of the phase diagram. Instead, the pressure and temperature conditions extend, as noted above, outside the supercritical fluid region for the reactivating agent.

A reactivating agent in the context of this invention is understood to be a compound capable of dissolving some or all of the fouling agents in a catalyst. The reactivating agent also reacts with some or all of the fouling agents. A preferred fluid reactivating agent in the context of this invention is a branched paraffin containing at least one tertiary carbon (a carbon atom single-bonded to three other carbon atoms). For example, isobutane has effectively been used in the context of this invention as a good fluid reactivating agent. Another fluid reactivating agent in the context of this invention is isopentane. Still another embodiment of the fluid reactivating agent within the scope of this invention is a mixture of isobutane and isopentane. Yet another embodiment is the use as fluid reactivating agent of additional compounds that contain at least one tertiary carbon, such as 2,3-dimethylbutane; 2- and 3-methylpentanes; 2,3- and 2,4-dimethypentanes; 2- and 3-methylhexanes; 2,3-, 2,4-, 2,5-, and 3,4-dimethylhexanes; 2,3,4-trimethylhexane; and the like. As illustrated above, these compounds may contain more than one tertiary carbon atom. Compounds such as straight-chain hydrocarbons that can be isomerized over the catalyst to compounds containing tertiary carbon atoms are also included as embodiments of the present invention. Some examples of isomerizable compounds, the listing herein of which does not exclude others, include n-butane which isomerizes to a small degree to isobutane, and n-pentane which can isomerize to isopentane. Other useful compounds include reactive or isomerizable/non-reactive fluid reactivating agent compounds that do not contain tertiary carbons, but are capable of hydride transfer reactions, such as toluene, benzene, ethylbenzene, or other aromatic compounds. Further useful compounds for the fluid reactivating agent include fluid solvent compounds which can react with fouling agents in manners different than hydride transfer. Some nonlimiting examples of such compounds include ionic compounds, polar compounds, or other compounds capable of reducing the affinity of bound carbocations for a solid catalyst active site, and/or removing by reaction all or part of the fouling agent from the catalyst active site. Various mixtures of the above compounds can also be utilized as desired.

The terms "branched paraffin" refer herein to at least one branched paraffin. Consequently, these terms encompass embodiments such as one single branched paraffin, a mixture of branched paraffins, and mixtures containing at least one branched paraffin which perform as the fluid reactivating agent of this invention that is embodied by at least one branched paraffin. Other embodiments of the fluid reactivating agent of this invention include mixtures of isoparaffins and hydrocarbons. Still other embodiments of the fluid reactivating agent of this invention include mixtures of a hydrocarbon with at least one gas such as hydrogen and oxygen. Examples of these embodiments include a mixture of isobutane and hydrogen, a mixture of isopentane and hydrogen, a mixture of isobutane, isopentane and hydrogen, and mixtures of any of the above example compounds or similar compounds with hydrogen.

The choice of the specific fluid reactivating agent depends in part on the pressure and temperature conditions at which the catalyst reactivation is to be performed. Known correlations between the number of carbon atoms of isoparaffins, easily derivable from tables of critical constants, can be readily employed to choose a specific hydrocarbon or hydrocarbon mixture as the fluid reactivating agent. For example, as shown in Table 1, the critical pressure decreases as the number of carbon atoms increases in the series including isobutane, isopentane, and 2,3-dimethylbutane or 2-methylpentane. In contrast, the critical temperature increases as the number of carbon atoms for the same compounds increases.

TABLE 1

| Hydrocarbon | $T_c/°C$ | $P_c/atm$ |
|---|---|---|
| $C_4H_{10}$, isobutane | 134.7 | 35.9 |
| $C_5H_{12}$, isopentane | 187.8 | 32.9 |
| $C_6H_{14}$, 2,3-dimethylbutane | 226.8 | 30.9 |
| 2-methylpentane | 334.3 | 30.0 |

The temperature and pressure conditions of the fluid reactivating agent such as isobutane employed in a method for reactivating a solid alkylation catalyst according to the invention are such that the temperature is preferably in the range of about 94° C. to about 250° C., and more preferably about 150° C. to about 210° C., and the pressure is preferably in the range of about 200 psig to about 5000 psig.

The catalyst to be reactivated by the methods of this invention can be any of the catalysts that are known to be effective in alkylation reactions. The fluid reactivating agent is such that it can penetrate into the channels or other voids or regions where the catalyst's deactivated sites are located. This is determined by the size and shape of the channels, voids or other spaces defined by the structure of the catalyst. As discussed above, the size and dimensions of species that are to effectively interact with the fouling agents that occupy the active sites of catalysts of varying structures are known, and thus the appropriate fluid reactivating agent can be chosen for each alkylation catalyst.

The present invention further provides the benefit of reducing or eliminating the need for oxidative regeneration of catalysts, thereby maintaining catalyst activity for longer periods of time which reduces the frequency of catalyst replacement and the accompanying cost.

EXAMPLES

Actual flow and reaction conditions for various embodiments of the present invention are illustrated by the following nonlimiting examples.

Example 1

The experiments performed with flows and reaction conditions within the ranges given in this set of examples were performed with a two-column swing system such as the system schematically shown in FIGS. 1A and 1B.

Reactor 1 was fed with a mixture of isobutane and trans-2-butene in a molar ratio that ranged from 1:1 to 100:1 referring to the isobutane:olefin molar ratio. Alkylation temperatures ranged from about 5° C. to about 90° C., and pressures ranging from ambient pressure to about 2100 psig. The olefin weight-hour-space velocity (OWHSV) was in the range from about 0.05 to 10 (g olefin) (g catalyst)$^{-1}$ h$^{-1}$.

Isobutane or other reactivating agents were fed to reactor 2 to reactivate the alkylation catalyst contained therein. Temperature in reactor 2 ranged from about 130° C. to about 250° C., and the pressure in the same reactor ranged from about 500 psig to about 4000 psig. Pressure and temperature were combined so that the isobutane or other reactivating agents were maintained in some trials in supercritical conditions whereas, in some other trials, slightly outside the supercritical region.

With a reactivating agent weight-hour-space-velocity (RWHSV, g reactivating agent (g catalyst)$^{-1}$ h$^{-1}$) greater than or equal to the isobutane weight hour space velocity (IWHSV, g isobutane (g catalyst)$^{-1}$ h$^{-1}$) in reactor 1, catalyst reactivation was achieved in times ranging from about 0.5 h to about 3 h for alkylation catalysts that had previously been completely deactivated, leading to up to 86% recovery of catalyst activity.

More specifically, an isobutane/olefin molar ratio of 20:1 was fed to reactor 1, which contained alkylation catalyst. The OWHSV was 0.2 g olefin (g catalyst)$^{-1}$ h$^{-1}$ and the IWHSV was 4.14 g isobutane (g catalyst)$^{-1}$ h$^{-1}$ in the same reactor. The RWHSV in reactor 2 ranged from about 24 to about 48 g reactivating agent (g catalyst)$^{-1}$ h$^{-1}$. The alkylation catalyst in reactor 2 was reactivated in about 2 h at reactivation conditions.

Example 2

Experiments were conducted in a plug-flow reactor system using 1 gram of catalyst packed into a stainless steel tubular reactor. The catalyst utilized for the experiments was a USY Zeolite catalyst. The isoparaffin to olefin ratio was 20:1 on a molar basis, while the olefin weight-hour-space velocity (OWHSV) was set at 0.2 g trans-2-butene (g catalyst)$^{-1}$ h$^{-1}$. Reaction conditions were 60° C. and 1600 psig, set so that the reaction occurred in the liquid phase. The reactivation was done using 99.5% isobutane (or other control reactivating agents), at various throughputs. The reactivation temperatures were varied from 130 to 210° C. and the pressures from 1000 to 3180 psig. Reactivation time (at conditions) was varied from 0.5 to 3 hours.

The run and reactivation procedures were as follows: The system was started initially with isobutane, at 60° C. and 1600 psig, throughout. At time zero, flow of reaction mixture (isobutane and trans-2-butene, as described above) was started. The reaction was allowed to proceed until the concentration of 2,2,4-trimethylpentane in the outlet stream (measured by gas chromatography (GC)) decreased to zero. At this point, reaction mixture flow was stopped, and the desired flow rate of fluid reactivating agent (control reactivating agents or isobutane), at 60° C. and 1600 psig, was started. These conditions were maintained for 10 minutes or long enough to sweep the reactants from the catalyst bed. The temperature and/or pressure were then adjusted to the desired conditions over 20–30 minutes. Reactivation conditions were held at the desired values for the desired period of time, after which the conditions were adjusted back to 60° C. and 1600 psig over 20–30 minutes. Once back at the reaction conditions, the reaction mixture flow was restarted and the reaction was allowed to proceed until the concentration of 2,2,4-trimethylpentane in the outlet stream decreased once again to zero.

Figure 3:
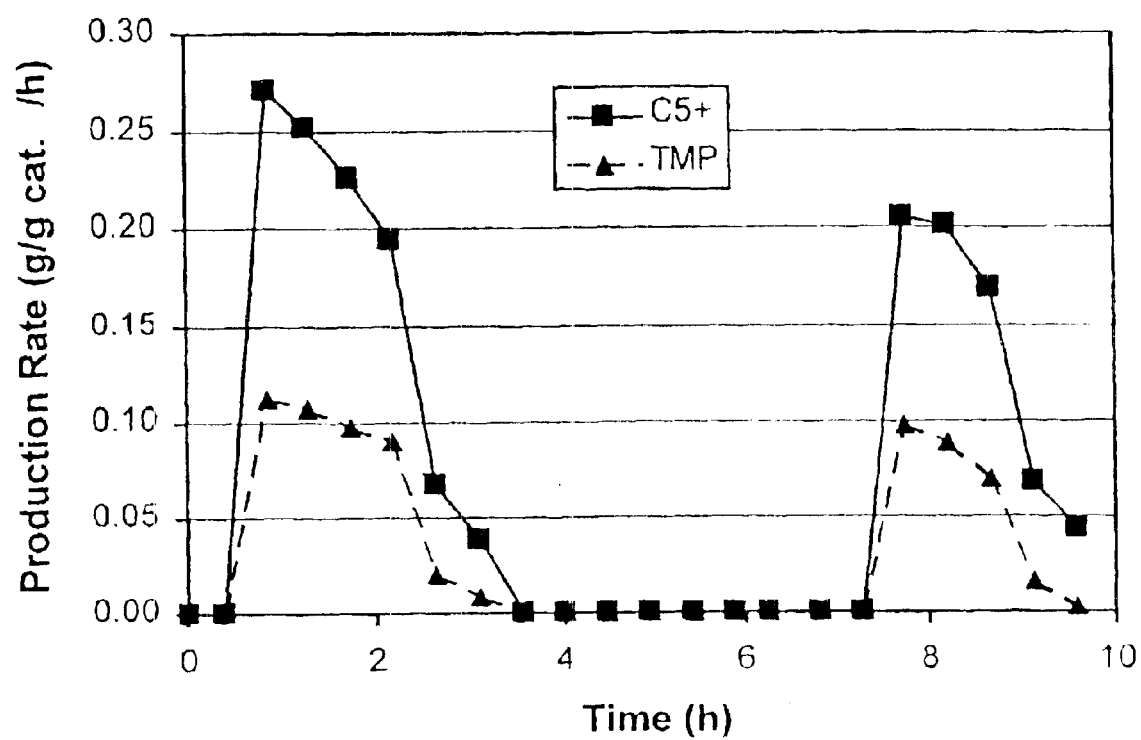
FIG. 3 shows a production rate vs. time diagram for an example reactivation run with isobutane as the regenerant, at 150° C., 1600 psig, 2 hours, and 33 g isobutane (g catalyst)$^{-1}$ h$^{-1}$.

Yields of product from the reaction were calculated by integrating the production rate versus time data. The production rate (g product (g catalyst)$^{-1}$ h$^{-1}$) data were calculated from the feed input rate (g feed (g catalyst)$^{-1}$ h$^{-1}$) and the product weight fraction (wt %) and plotted versus time. An example plot of the data for total alkylate (C5+) and for trimethylpentanes (TMP) is shown in FIG. 3. The initial reaction and reactivated catalyst reaction peaks were integrated, and the percentage of activity recovered was calculated by dividing the second peak area by the first peak area and multiplying by 100%. Reactivation conditions for the example shown were 150° C., 1600 psig, 33 g isobutane fed (g catalyst)$^{-1}$ h$^{-1}$, for two hours (at reactivation conditions).

Figure 4:
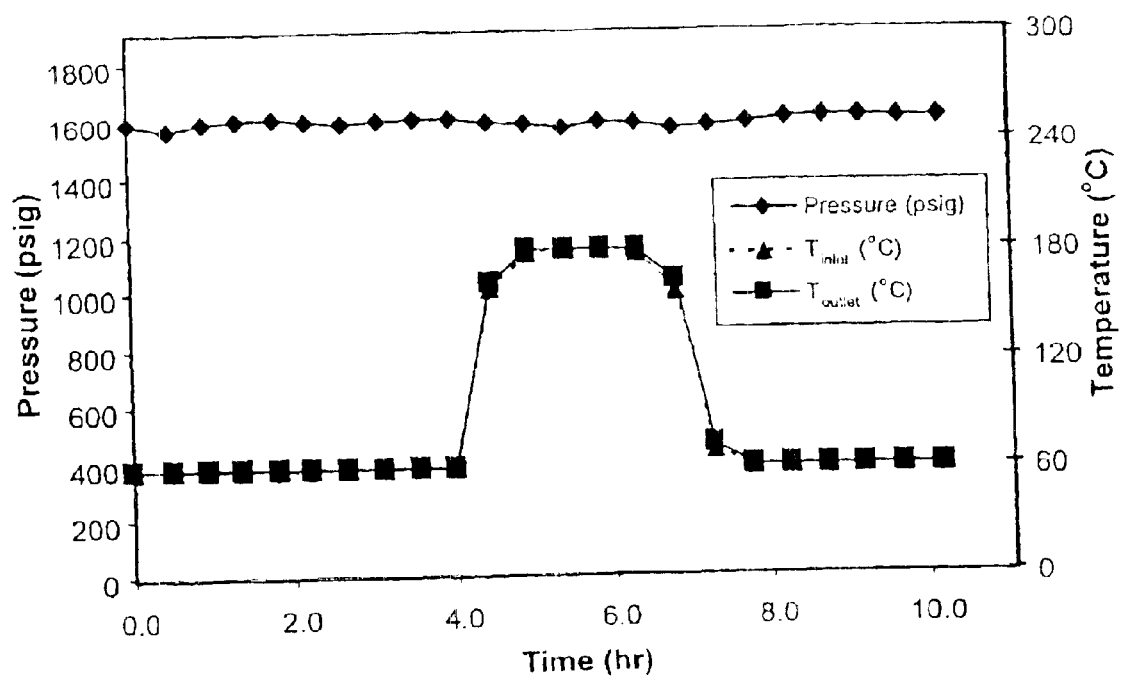
FIG. 4 shows a diagram of process conditions over the course of the run for an example reactivation run with isobutane as the regenerant, at 180° C., 1600 psig, 2 hours, and 33 g isobutane (g catalyst)$^{-1}$ h$^{-1}$.
Figure 5:
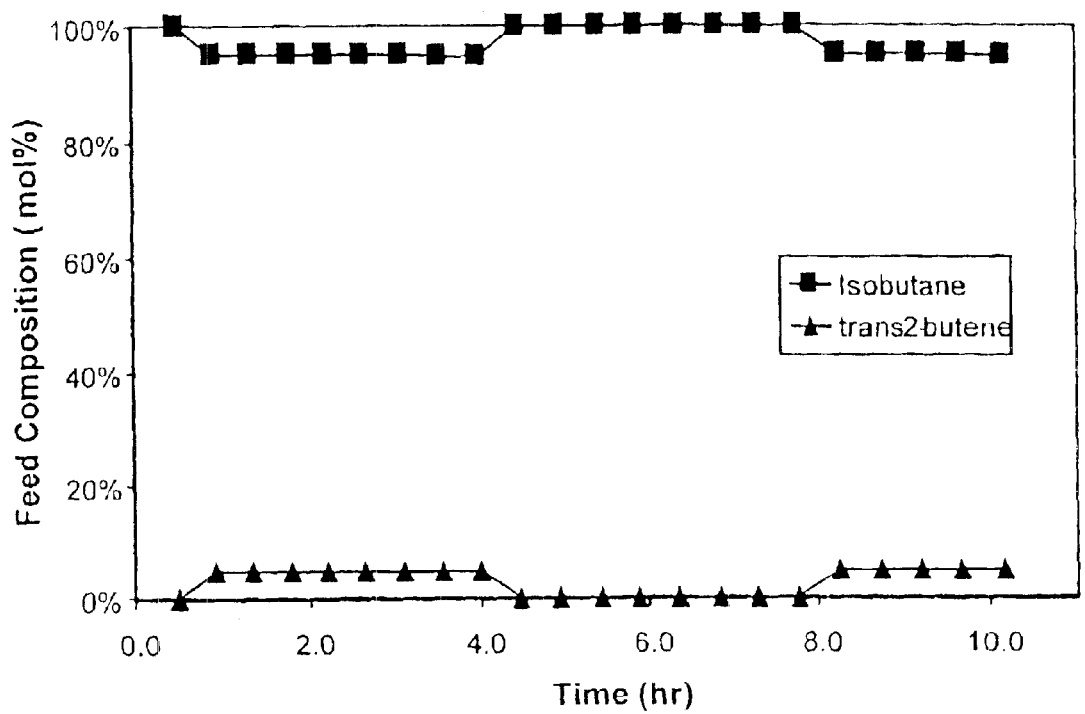
FIG. 5 shows a diagram of feed composition data as a function of time for the example reactivation run with isobutane as the regenerant, at 180° C., 1600 psig, 2 hours, & 33 g isobutane (g catalyst)$^{-1}$ h$^{-1}$.

The following results were obtained from runs at reaction conditions of 60° C., 1600 psig, olefin weight hour space velocities (OWHSV) of 0.2 and 0.4, and an isoparaffin:olefin molar ratio of 20:1. FIGS. 4 and 5 show the process conditions for the experiment with the OWHSV set at 0.2, while Table 2 summarizes activity recoveries, with the OWHSV set at 0.2 and 0.4, for total alkylate (C5+ and trimethylpentanes (TMP)) as well as process conditions graphically given in FIGS. 4 and 5.

TABLE 2

|  | OWHSV (g olefin (g catalyst)$^{-1}$ h$^{-1}$) | |
| --- | --- | --- |
|  | 0.2 | 0.4 |
| Reaction Conditions | | |
| Temperature (° C.) | 60 | 60 |
| Pressure (psig) | 1600 | 1600 |
| Molar Isobutane:trans-2-butene | 20.0:1 | 20.2:1 |
| Actual OWHSV (g trans-2-butene (g catalyst)$^{-1}$ h$^{-1}$) | 0.19 | 0.38 |
| Reactivation Conditions | | |
| Reactivating Agent | Isobutane | Isobutane |
| Temperature (° C.) | 180 | 180 |

TABLE 2-continued

|  | OWHSV (g olefin (g catalyst)$^{-1}$ h$^{-1}$) | |
| --- | --- | --- |
|  | 0.2 | 0.4 |
| Pressure (psig) | 1600 | 1600 |
| Reaction Mix Washout time (with isobutane) (min) | 10 | 10 |
| RWHSV (g regenerant (g catalyst)$^{-1}$ h$^{-1}$) | 33.6 | 34.4 |
| Time at Reactivation Conditions (h) | 2.0 | 2.0 |
| Reactivation Results | | |
| Total Alkylate (C5+); (% of initial) | 75 | 78 |
| Trimethylpentanes (TMP; % of initial) | 82 | 77 |

A series of controls using non-reactive reactivating agents to reactivate completely deactivated catalyst were run to illustrate the benefits of using reactive reactivating agents. These non-reactive reactivating agents included helium, propane, n-butane, and n-pentane. In each case, the reactivation was run for 2 h at reactivating conditions, with 33 g reactivating agent (g catalyst)$^{-1}$ h$^{-1}$. Where possible, each reactivating agent's phase was varied in separate controls to include near-critical (NC) liquid and supercritical fluid (SCF) phases. Additional controls were run for each non-reactive reactivation agent at constant-density in the supercritical phase, where the density of the reactivation agent was equal to the density of isobutane at 180° C. and 1600 psig, based on the Peng-Robinson equation of state.

The results are summarized in Table 3. Data for two reactive reactivating agents, isobutane and isopentane, run in NC liquid and SCF phases, are included in Table 3 for comparison with the non-reactive reactivating agents. Abbreviations for the effects tested are defined as follows. Helium, a gas, tests the amount of reactivation obtained with simple volatilization (V) of small molecular weight or thermally-cracked fouling agents. High reactivation temperatures can cause fouling components to degrade by thermal cracking (C) into smaller molecules that are more easily extracted by the reactivating agent. Each of the fluid reactivating agents can act as solvents in NC liquid or SCF phases to effect solubilization (S) of fouling agents. Reactivating agents that are in the supercritical phase test the additional effect of supercritical fluid extraction (SFE) on reactivation. Adjusting reactivation conditions to give a constant density reactivating agent (set to the density of isobutane at 180° C., 1600 psig) tests the effectiveness of each supercritical fluid at the same density (ρ) on recovery of activity. Finally, the use of reactivating agents that contain at least one tertiary carbon atom tests the effect on activity recovery of using a reactive reactivating agent (R). The reaction phase in each experiment in summarized Table 3 was run as in the examples above, at 60° C., 1600 psig, a molar isobutane:trans-2-butene ratio of 20:1, and an OWHSV of 0.2.

TABLE 3

| Reactivating Agent | T (° C.) | P (psig) | Phase | \multicolumn{6}{c|}{Effect Tested} | TMP Activity Recovery (% of Initial) |
| --- | --- | --- | --- | --- | --- | --- | --- | --- | --- | --- |
| | | | | V | C | S | SFE | ρ | R | |
| Non-Reactive Reactivating Agents* | | | | | | | | | | |
| helium | 180 | 1600 | gas | ✓ | ✓ | | | | | 33 |
| propane | 180 | 1600 | SCF | ✓ | ✓ | ✓ | ✓ | | | 24 |
| propane | 180 | 2980 | SCF | ✓ | ✓ | ✓ | ✓ | ✓ | | 28 |
| n-butane | 140 | 1600 | NC liq. | ✓ | ✓ | | | | | 30 |
| n-butane | 180 | 1600 | SCF | ✓ | ✓ | ✓ | ✓ | | | 51 |
| n-butane | 180 | 1310 | SCF | ✓ | ✓ | ✓ | ✓ | ✓ | | 46 |
| n-pentane | 180 | 1600 | NC liq. | ✓ | ✓ | | | | | 22 |
| n-pentane | 210 | 1600 | SCF | ✓ | ✓ | ✓ | ✓ | | | 40 |
| n-pentane | 210 | 915 | SCF | ✓ | ✓ | ✓ | ✓ | ✓ | | 42 |
| Reactive Reactivating Agents | | | | | | | | | | |
| isobutane | 60 | 1600 | Liquid | | | ✓ | | | ✓ | 0.4 |
| isobutane | 90 | 1600 | Liquid | S** | ✓ | | | | ✓ | 3 |
| isobutane | 130 | 1600 | NC liq. | ✓ | ✓ | | | | ✓ | 50 |
| isobutane | 180 | 1600 | SCF | ✓ | ✓ | ✓ | ✓ | ✓ | ✓ | 82 |
| isopentane | 180 | 1600 | NC liq. | ✓ | ✓ | | | | ✓ | 59 |
| isopentane | 200 | 1600 | SCF | ✓ | ✓ | ✓ | ✓ | | ✓ | 65 |
| isopentane | 200 | 850 | SCF | ✓ | ✓ | ✓ | ✓ | ✓ | ✓ | 58 |

*The reactivating agents n-pentane and n-butane isomerize to a small degree (<1%) over acid catalysts to form isopentane and isobutane, respectively, which contain a tertiary carbon atom and can therefore take place in the hydride transfer reaction during reactivation. Thus, a small but undetermined amount of the recovered activity may be due to reactivity of the isomerized reactivating agent. Of the straight-chain hydrocarbons included in this set of control reactivating agents, only propane cannot isomerize to form a hydrocarbon containing a tertiary carbon atom and so cannot form a reactive species.
**S = Slight. This is meant to indicate a slight amount of cracking at this lower temperature.

Figure 6:
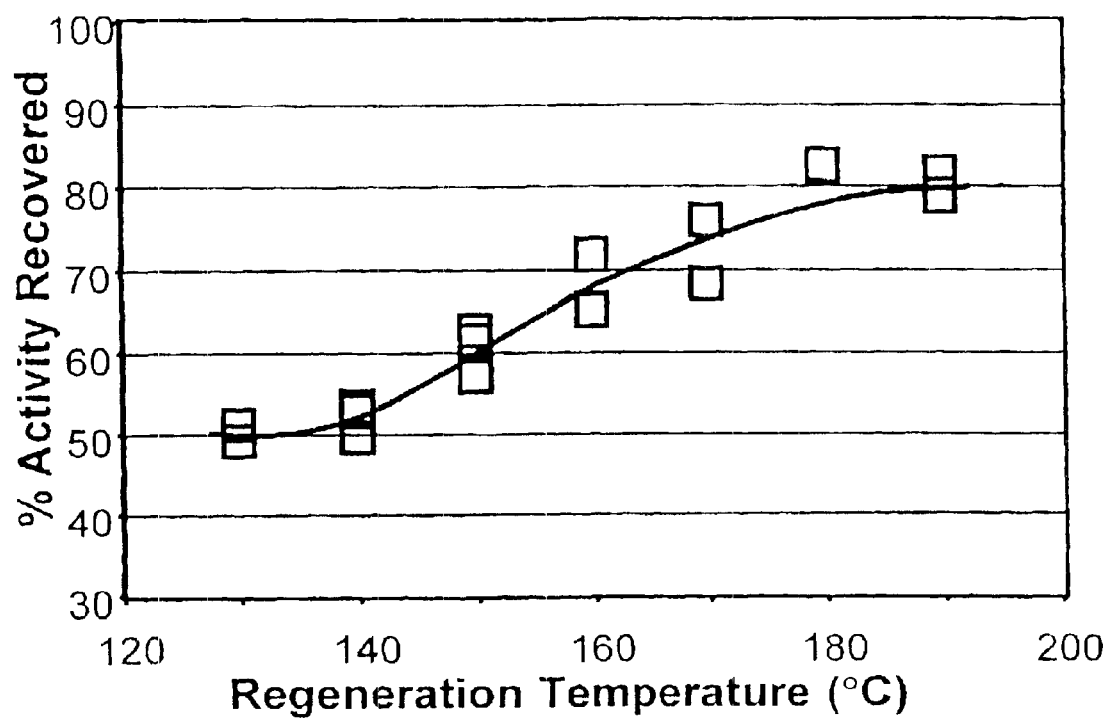
FIG. 6 diagrammatically shows the effect of the temperature on the percentage of recoverable trimethylpentane (TMP) production with isobutane as the regenerant, at 1600 psig, 2 hours, and 33 g isobutane (g catalyst)$^{-1}$ h$^{-1}$.

The data provided hereinabove show that simple thermal cracking and volatilization using helium can recover about 33% of the initial activity. The data also show that a liquid phase reactive reactivating agent cannot reactivate the catalyst to a significant degree once it has been completely deactivated. The amount of activity recoverable decreases with decreasing reactivation temperature (i.e., activity recovery using isobutane: 180° C.>130° C.>90° C.>60° C.; see also FIG. 6), indicating that thermal cracking plays an important role in the reactivation of completely deactivated catalyst. Thus, decreasing to a liquid phase from near-critical liquid conditions (by lowering the temperature) eliminates the regenerative nature of the reactivation procedure.

The data further show that a non-reactive reactivating agent that cannot isomerize to a reactive reactivating agent recovers less activity than a non-reactive reactivating agent that can isomerize to a reactive reactivating agent (i.e., SCFs: propane (24%)<n-butane (51%) or n-pentane (40%); Constant density SCFs: propane (28%)<n-butane (46%) or n-pentane (42%)).

For structurally similar reactivating agents that can isomerize to reactive reactivating agents, the foregoing data also show for a particular catalyst that within a phase (NC liquid, SCF), reactivation using non-reactive reactivating agents generally decreases with increasing molecular weight (i.e., NC liquids: n-butane (30%)>n-pentane (22%); SCFs: n-butane (51%)>n-pentane (40%); Constant density SCFs: n-butane (46%)>n-pentane (42%)). This trend was also observed for the two reactive reactivating agents in the SCF phase (i.e., SCFs: isobutane (82%)>isopentane (65%); Constant density SCFs: isobutane (82%)>isopentane (58%)). The activity recovery increased in the NC liquid phase from 50% for isobutane to 59% for isopentane, which was most probably the effect of additional thermal cracking at 180° C. (isopentane NC liquid) versus 130° C. (isobutane NC liquid).

Furthermore, reactivations run in the SCF phase, when conditions were maintained at the same pressure and at similar temperatures as in the NC liquid phase, were generally more effective than those run in the NC liquid phase with the same reactivating agent, whether the reactivating agent was reactive or non-reactive (i.e., Changing from NC liquid to SCF results in: n-butane (30% to 51%); n-pentane (22% to 40%); isobutane (50% to 82%); isopentane (59% to 65%)). When the reactivations were then run at lower pressures, thereby adjusting the SCF fluid density of the reactivating agent to the density of SCF isobutane at 1600 psig and 180° C., the amount of reactivation generally decreased slightly or did not change appreciably from the reactivation observed at the prior SCF condition (i.e., Changing from SCF to constant density SCF results in: propane (24% to 28%); n-butane (51% to 46%); n-pentane (40% to 42%); isopentane (65% to 58%)).

The data provided hereinabove also show that near-critical liquid and supercritical phase reactivation were more efficient for catalyst activity recovery than gas phase reactivation.

Thus in general, within the bounds of the control set tested and listed above in Table 3, the data show that supercritical phase is preferred over Liquid phase and NC liquid conditions. The data also show that thermal cracking is an important part of the regenerative nature of the reactivation procedure. The data show further that reactive reactivating agents are generally preferred over non-reactive reactivating agents, although even isomerizable non-reactive reactivating agents such as n-butane and n-pentane in the supercritical phase can be useful in the methods of the invention. Thus, isobutane (reactive) is generally preferable over n-butane (non-reactive), and isopentane (reactive) is generally preferable over n-pentane (non-reactive).

The data show further that for structurally similar hydrocarbons that are chemically similar, reactivating agents of increased molecular weight in the same phase and at similar pressures and temperatures generally decreases reactivation efficiency, whether the reactivating agent is reactive or non-reactive. Thus, n-butane is preferred over n-pentane when they are maintained at similar thermodynamic conditions. Further, isobutane is generally preferable over isopentane. However, for structurally similar hydrocarbons that can become reactively different through isomerization, such as n-butane versus propane, the compound that can isomerize to a reactive compound is preferred over the one that cannot isomerize. Thus, n-butane and n-pentane are generally preferred over propane.

A preferred feature of the reactive fluid reactivating agent is a tertiary carbon atom, which is believed to allow the fluid reactivating agent molecule to participate in hydride transfer during reactivation. As reflected by the data provided hereinabove, the recovery enhancement was seen in both NC liquid (isopentane versus n-pentane) and SCF (isobutane versus n-butane and propane) phases, but not in the liquid phase.

Example 3

Figure 7:
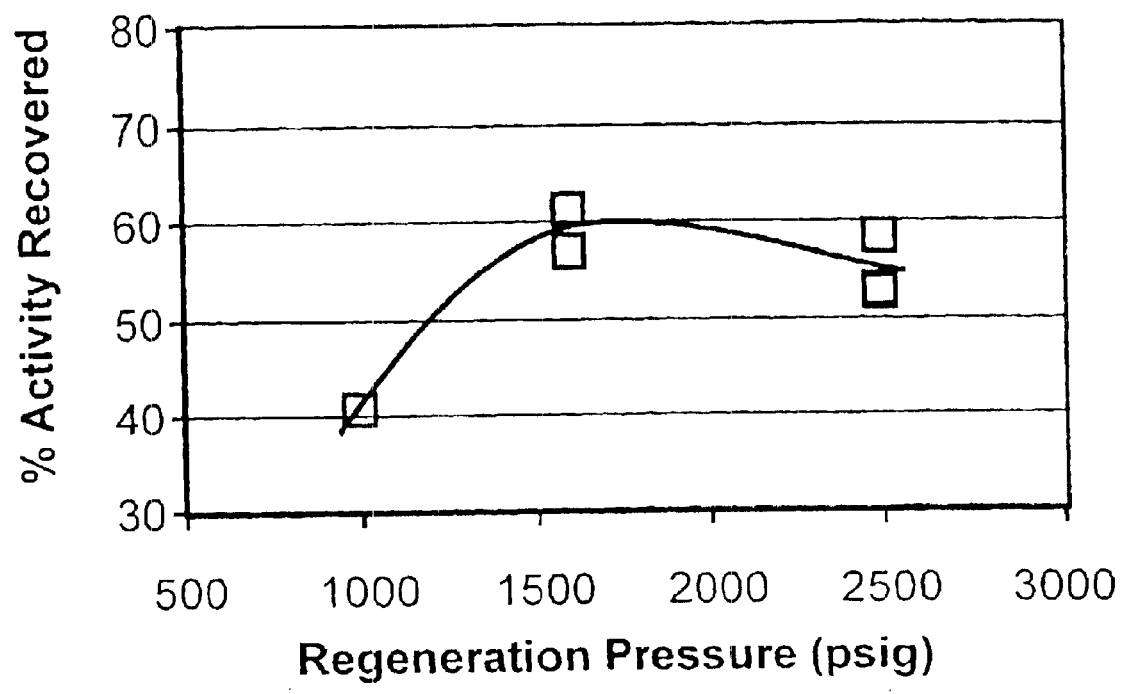
FIG. 7 shows the effect of the pressure on the percentage of recoverable trimethylpentane (TMP) production with isobutane as the regenerant, at 150° C., 2 hours, and 33 g isobutane (g catalyst)$^{-1}$ h$^{-1}$.
Figure 8:
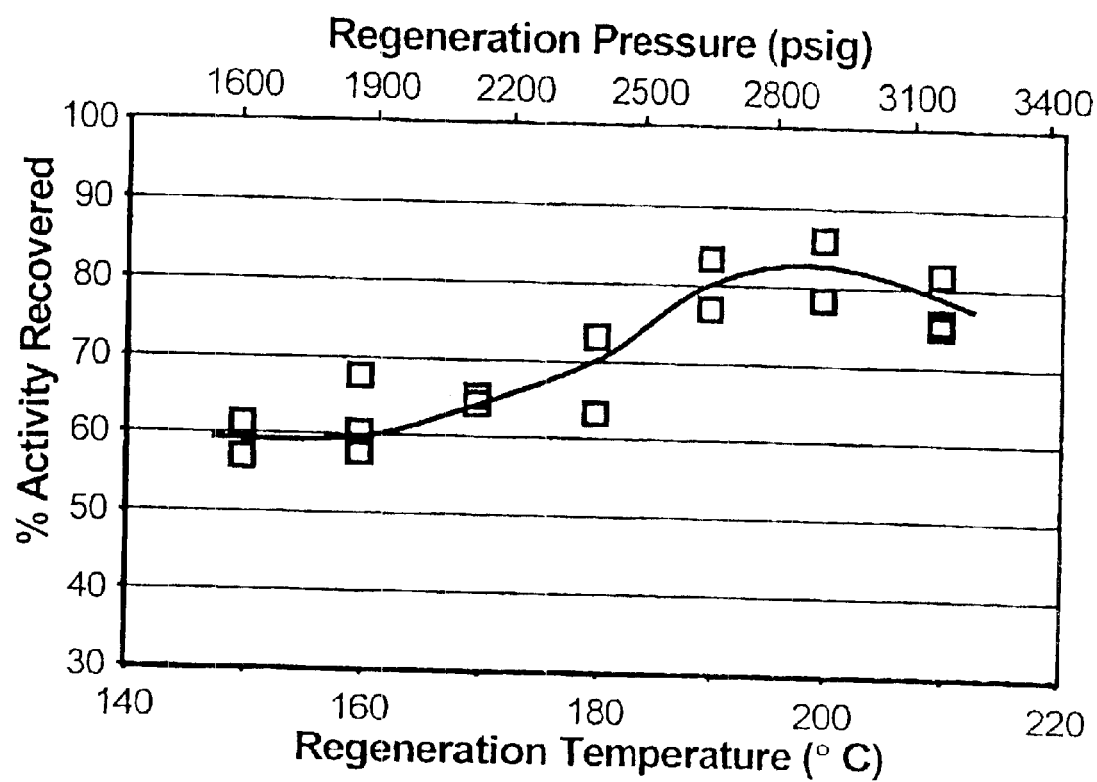
FIG. 8 shows the effect of temperature on the percentage of recoverable trimethylpentane (TMP) production with isobutane as the regenerant, at a constant isobutane density of 0.41 g/mL, 2 hours, and 33 g isobutane (g catalyst)$^{-1}$ h$^{-1}$.

A series of experiments were performed to determine the effect of reactivation conditions on activity recovery with isobutane for a completely deactivated catalyst under near-critical to supercritical conditions, since it was shown that there is no significant reactivation of completely deactivated catalyst in the liquid phase. Variables included reactivation temperature, pressure, time, and isobutane throughput. In addition, experiments using the temperature, time, and isobutane throughput values and varied pressure to obtain a constant isobutane density were performed. Reaction conditions were as in Example Set 2, at an OWHSV of 0.2 g trans-2-butene (g catalyst)$^{-1}$ h$^{-1}$. Reactivation protocols were also as described in Example Set 2, but using isobutane always as the fluid reactivating agent. It was found that about 33 g isobutane (g catalyst)$^{-1}$ h$^{-1}$ is a preferred isobutane throughput with a reactivation time (at reactivation temperature and pressure) of 2 hours. Temperatures from 130–210° C. (0.99–1.19 $T_c$) were tested, ranging from near-critical liquid to supercritical. Pressures were varied from 1000–3180 psig (1.86- 5.87 $P_c$) The results for temperature, pressure, and temperature at constant density are presented in FIGS. 6, 7, and 8, respectively. As shown in these Figures, the maximum observed recoverable catalyst activity under these conditions, and with complete deactivation of the catalyst before reactivation with isobutane, was found to be 83–86%, occurring in the temperature range 180–200° C. The temperature at maximum observed recovery in the range was found to depend on system pressure.

Example 4

This set of experiments was conducted in a plug-flow reactor system with a recycle line to return part of the reactor effluent to the reactor inlet stream. This effectively increased the net isobutane:trans-2-butene molar ratio within the reactor by recycling mainly isobutane, and mimicking the behavior of a continuous stirred tank reactor (CSTR). Experiments were done using catalyst packed into a stainless steel tubular reactor. The same catalyst as above was used for the recycle experiments. Reaction volumetric recycle ratios (recycle flowrate/inlet flowrate) ranged from 4.1:1 to 41:1. A product stream was bled from the recycle stream at a flowrate equivalent to the inlet flow. The molar isoparaffin to olefin ratio was 20:1, while the OWHSV ranged from 0.2–0.4 g trans-2-butene (g catalyst)$^{-1}$ h$^{-1}$. Reaction conditions were again 60° C. and 1600 psig. The reactivation was done as above, at 33 g isobutane (g catalyst)$^{-1}$ h$^{-1}$, for 2 hours (at conditions). The reactivation temperature and pressure were 180° C. and 1600 psig, respectively.

The run and reactivation procedures were as before, with the following modifications. The system was started with the recycle pump "ON." The reaction was allowed to proceed until a desired level of activity (that served as a criterion for starting the reactivation) was reached. Criteria used in various experiments included: Butene conversion dropping below a desired value for the first run, and the run time required for the first run used for the second run; butene conversion dropping below a desired value (i.e., 90 or 95%); and a specified period of reaction time.

At this point, reaction mixture flow was stopped, and flow of 33 g isobutane (g catalyst)$^{-1}$ h$^{-1}$, at 60° C. and 1600 psig, was started. The recycle pump was left "ON" to clear the recycle line of products and trans-2-butene. These conditions were maintained for 10 minutes or long enough to sweep the reactants from the catalyst bed. The recycle pump was then shut off and the temperature was adjusted to 180° C. over 20–30 minutes. Reactivation conditions were held at 180° C. and 1600 psig for 2 h, after which the conditions were adjusted back to 60° C. and 1600 psig over 20–30 minutes. Once back at the reaction conditions, the recycle pump was turned "ON." After 5 minutes, the reaction mixture flow was restarted and the reaction was allowed to proceed until the desired criterion was again reached. Yields of product from the reaction were calculated as above.

Table 4 summarizes the results of plug flow experiments with recycle reactivation run at 0.2 and 0.4 WHSV, using as reactivation criteria both a specified butene conversion (before and after reactivation) and identical times for each run (before and after reactivation). Reaction was done at 60° C., 1600 psig, OWHSVs of 0.2 or 0.4 g trans-2-butene (g catalyst)$^{-1}$ h$^{-1}$, and an isoparaffin: olefin ratio of 20:1. Note for the rightmost columns that the butene conversion reached the stop criterion for the second run (after reactivation) in a shorter period of time than in the first run, and therefore recovery values were less than 100% of the initial activity. Conversely, in the first two columns, which use the same amount of time in each run (equal to the time required to reach the butene conversion criterion in the 1$^{st}$ run), the recoveries were generally greater than 100% of the initial activity. This is because the reactive reactivation method activates the catalyst active sites, thus reducing the catalyst induction period and increasing the initial rate of product formation. This results in higher yields after reactivation versus fresh catalyst, in equal time periods.

TABLE 4

|  | Time to reach 1$^{st}$ Regeneration | | Desired Butene Conversion | |
|---|---|---|---|---|
|  | OWHSV (g butene (g catalyst)$^{-1}$ h$^{-1}$) | | | |
|  | 0.2 | 0.4 | 0.2 | 0.4 |
| Actual OWHSV (g butene (g catalyst)$^{-1}$ h$^{-1}$) | 0.19 | 0.40 | 0.19 | 0.37 |
| Volumetric Recycle Ratio | 12:1 | 12:1 | 12:1 | 12:1 |
| Reactivation criteria |  |  |  |  |
| 1$^{st}$ Run Reactivation | X = 0.95* | X = 0.90* | X = 0.95* | X = 0.90* |
| 2$^{nd}$ Run End | Time** | Time** | X = 0.95* | X = 0.90* |

TABLE 4-continued

|  | Time to reach 1st Regeneration OWHSV (g butene (g catalyst)$^{-1}$ h$^{-1}$) | | Desired Butene Conversion | |
| --- | --- | --- | --- | --- |
|  | 0.2 | 0.4 | 0.2 | 0.4 |
| Recovered Activity | | | | |
| Total Alkylate (C5+); (% of initial) | 96% | 110% | 83% | 90% |
| Trimethylpentanes (TMP; % of initial) | 100% | 110% | 86% | 89% |

*X = Butene conversion, defined as the fraction of butene fed that is reacted in the catalyst bed. The butene conversion is calculated as the difference between reactor inlet and reactor outlet butene concentrations, divided by the reactor inlet butene concentration. Since the reaction initially operates at 100% conversion of butene (X = 1.0), X must drop (indicating catalyst deactivation) to reach the reactivation criterion.
**Time = The experimental time taken in the 1st run to reach the specified butene conversion. The second run (after reactivation) was then stopped after an identical period of time.

Example 5

Figure 9:
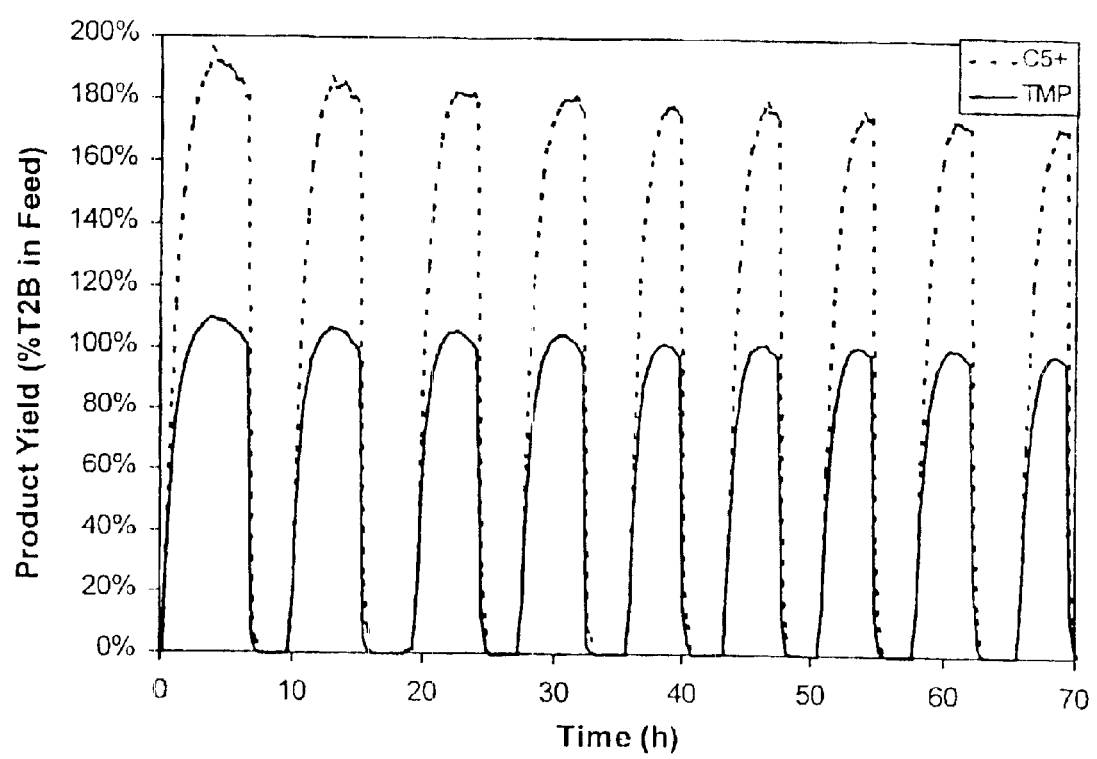
FIG. 9 shows total alkylate (C5+) and trimethylpentanes (TMP) product yields for a multiple reactivation experiment with reaction at 60° C., 1600 psig, an OWHSV of 0.2 g trans-2-butene (g catalyst)$^{-1}$ h$^{-1}$, inlet isobutane: trans-2-butene molar ratio of 20:1, in the plug flow reactor with recycle. The recycle ratio was 12:1. Reactivation was at 180° C., 1600 psig, for 2 hours, with 33 g isobutane (g catalyst)$^{-1}$ h$^{-1}$. The reactivation criterion was butene conversion dropping to below 95%.
Figure 10:
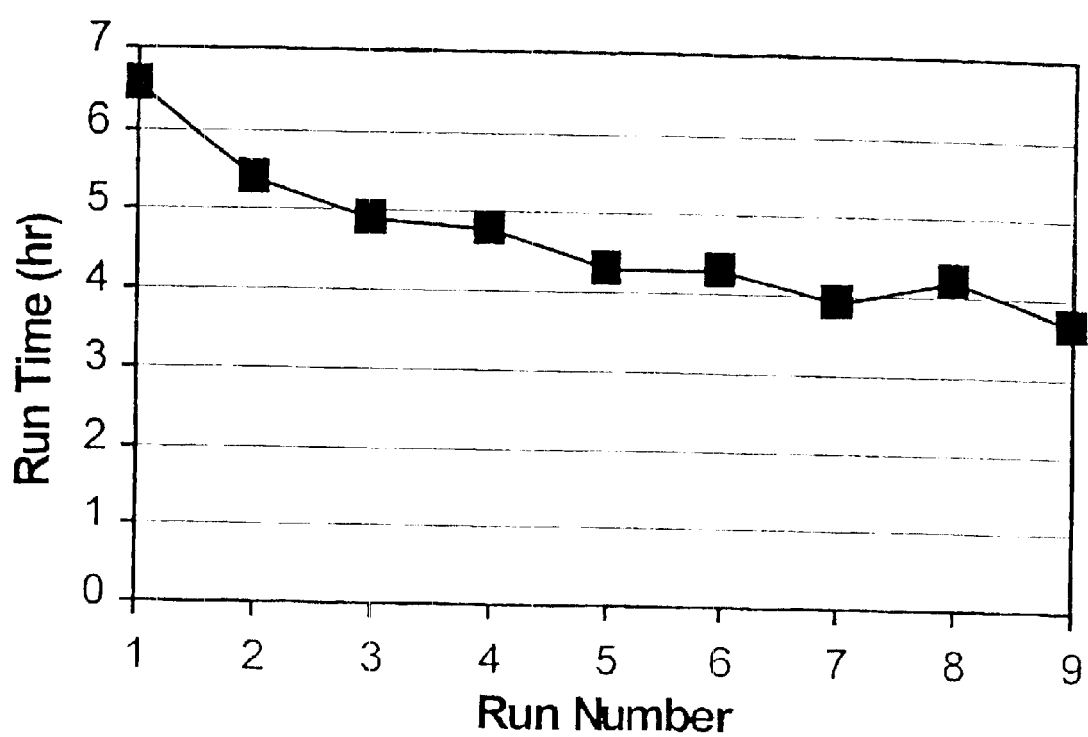
FIG. 10 shows the variation of run time (time to drop to 95% butene conversion) with each successive run (after being reactivated) for the multiple reactivation experiment in the recycle reactor at an OWHSV of 0.2 g trans-2-butene (g catalyst)$^{-1}$ h$^{-1}$.
Figure 11:
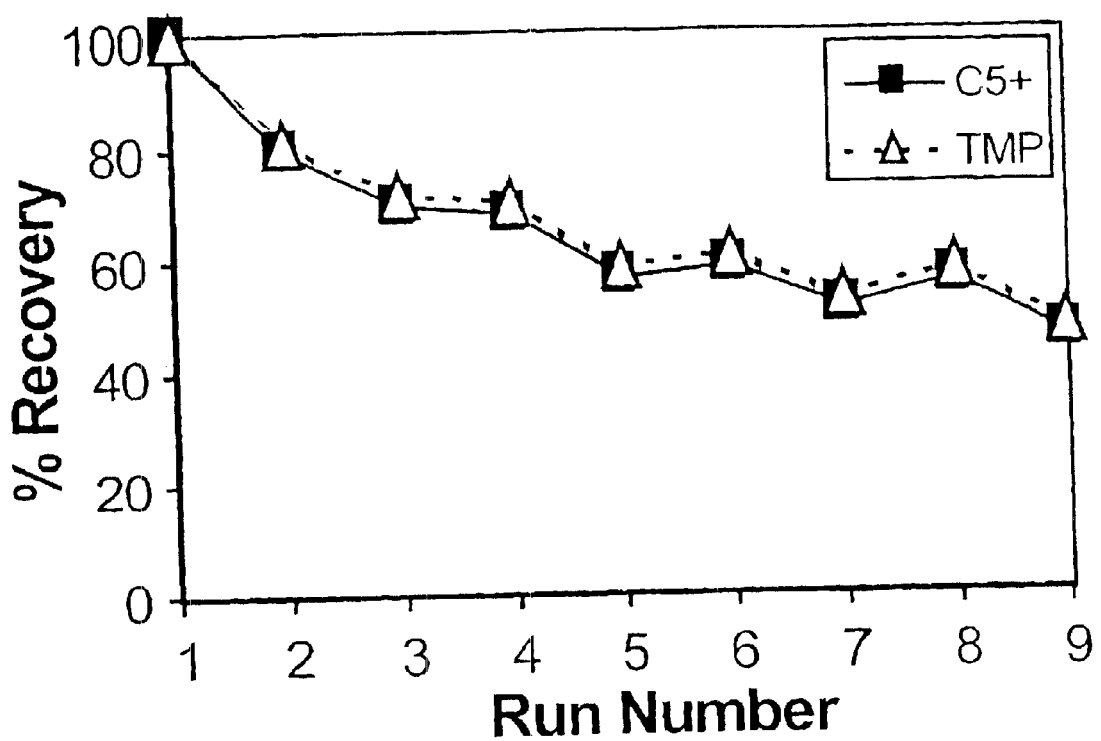
FIG. 11 shows the change in percentage of recovered alkylate (C5+) and trimethylpentane (TMP) production with each successive run (after being reactivated) for the multiple reactivation experiment in the recycle reactor at an OWHSV of 0.2 g trans-2-butene (g catalyst)$^{-1}$ h$^{-1}$. Values are compared with the initial run (100%).
Figure 12:
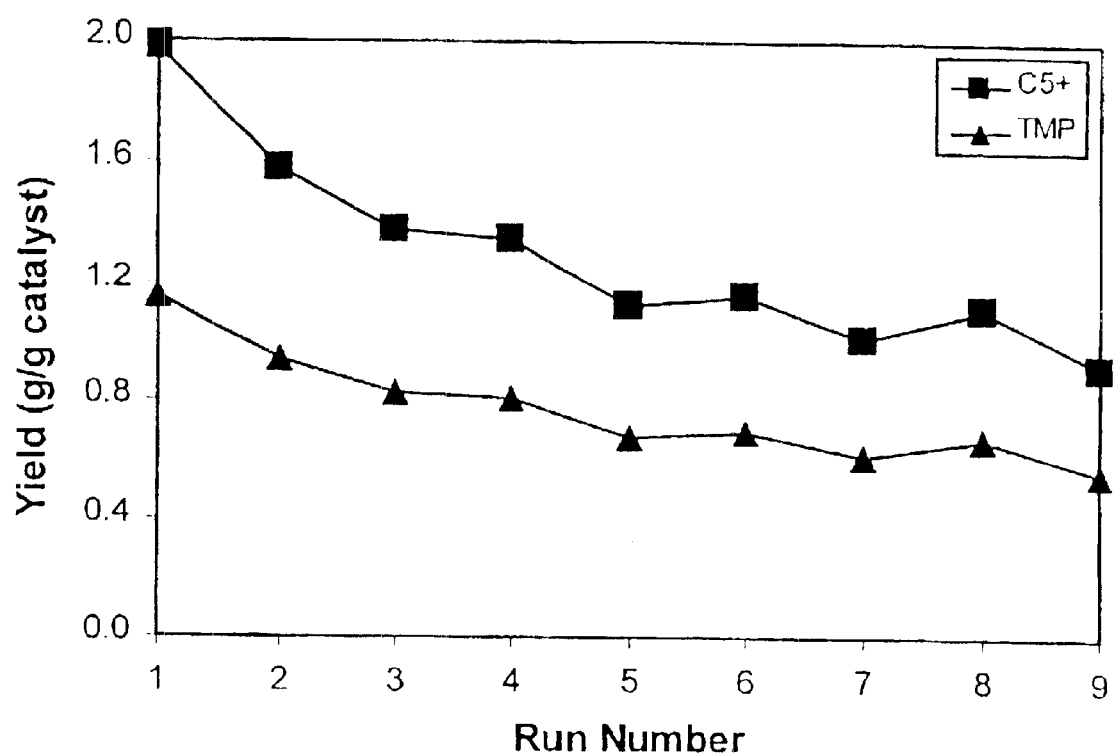
FIG. 12 shows total alkylate (C5+) and trimethylpentane (TMP) yields in each successive run (after being reactivated) for the multiple reactivation experiment in the recycle reactor at an OWHSV of 0.2 g trans-2-butene (g catalyst)$^{-1}$ h$^{-1}$.
Figure 13:
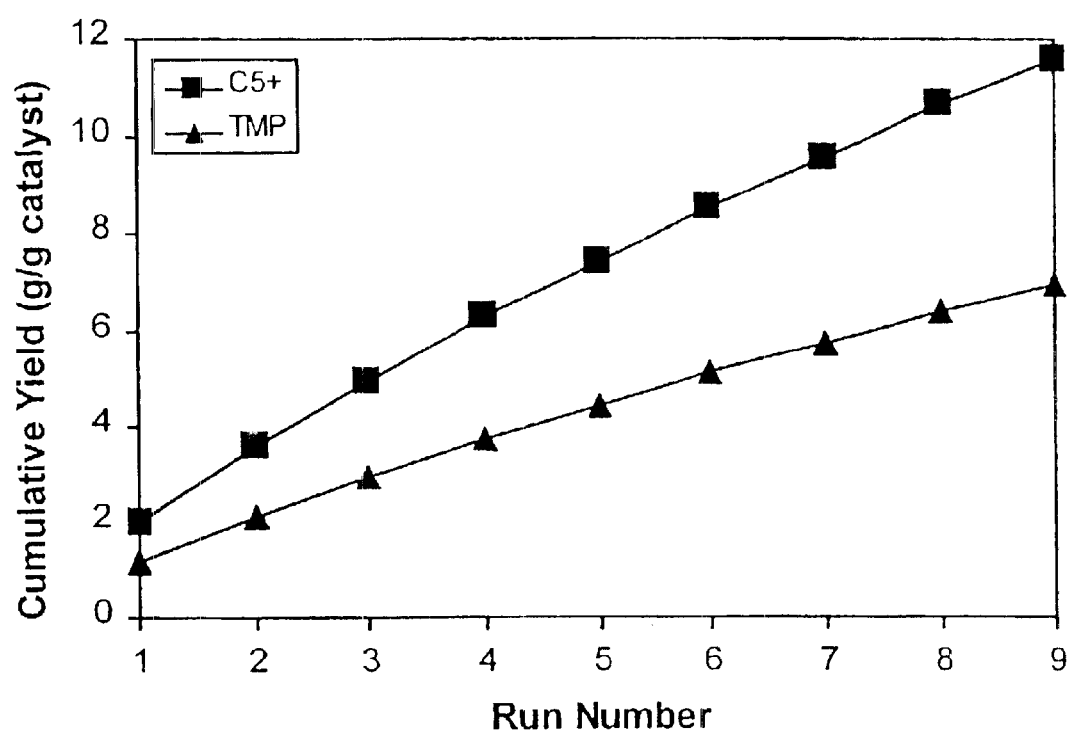
FIG. 13 shows the variation of cumulative alkylate (C5+) and trimethylpentane (TMP) yields with run number for the complete multiple reactivation experiment in the reactor at an OWHSV of 0.2 g trans-2-butene (g catalyst)$^{-1}$ h$^{-1}$.
Figure 14:
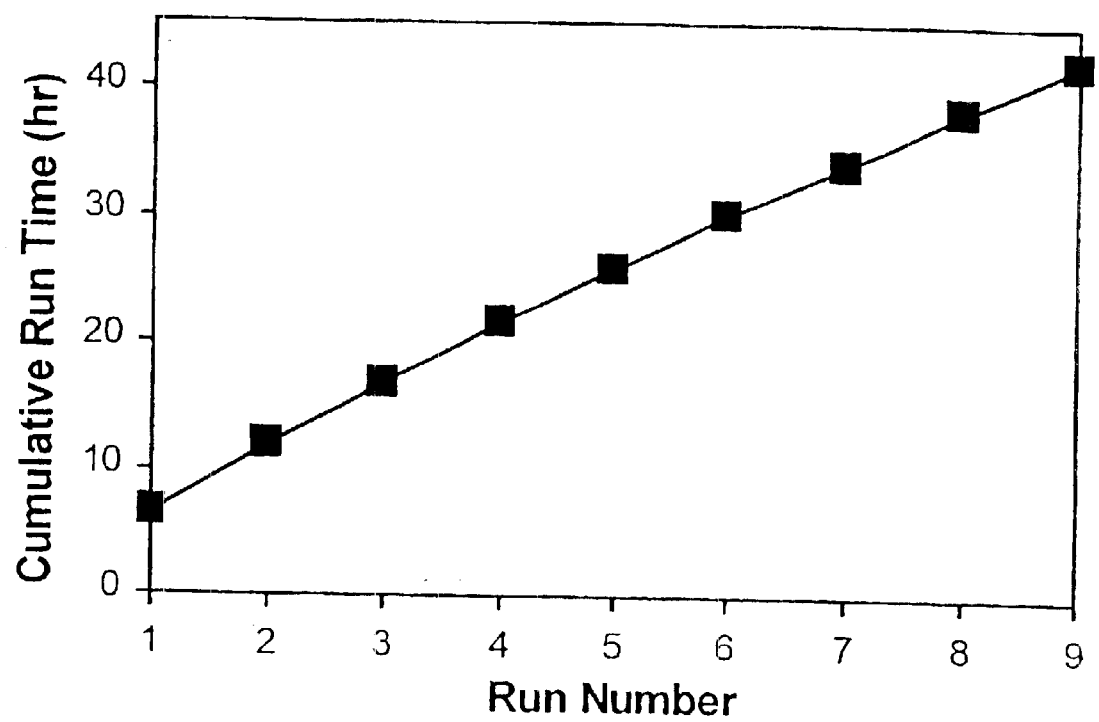
FIG. 14 shows the cumulative run time with run number for the complete multiple reactivation experiment in the recycle reactor at an OWHSV of 0.2 g trans-2-butene (g catalyst)$^{-1}$ h$^{-1}$.

Recycle plug flow experiments utilizing multiple reactivation runs (more than one reactivation) were conducted to determine a preferred upper bound for the number of reactivations possible under the conditions at which these experiments were conducted. The experiments were done using reaction conditions as reported in Example Set 4, ranging in OWHSV from 0.2–0.4 g trans-2-butene (g catalyst)$^{-1}$ h$^{-1}$. Reactivation was with isobutane as above; the reactivation criteria were that butene conversion dropped to 95% or 90% for 0.2 and 0.4 OWHSV, respectively. FIGS. 9–14 show the C5+ and TMP production results and run times for a complete multiple reactivation experiment at an OWHSV of 0.2. FIG. 9 shows the C5+ and TMP yields (per unit butene fed to the alkylation reactor) versus total experimental run time. FIGS. 10–12 show the variations in reaction run time, % recovered catalyst activity, and product yields (per gram of catalyst) with each successive reactivation. Cumulative product yields and catalyst life are shown in FIGS. 13 and 14.

As shown in FIGS. 10–12, product yields and run times decreased slowly over time because the net OWHSV in the reactor slowly increased due to increasing deactivation with each successive run. However, activity leveled off after a time, approaching a steady state between deactivation and reactivation.

Activity could be maintained at reduced levels over at least 8 reactivations without requiring oxidation at an OWHSV of 0.2, using 95% butene conversion as the reactivation criterion. As shown in FIG. 14, the reactivation procedure provided a net catalyst life of about 42 h through eight reactivations.

As shown in FIG. 13, total product yields were greatly increased using this reactivation method and strategy as compared to the single-use yields. In FIG. 10, it is apparent that run times slowly decreased at these conditions, to an apparent asymptote near 3 hours. Thus, the reactivation criterion for the following example was chosen to be 3 h of alkylation before beginning reactivation.

Example 6

Figure 15:
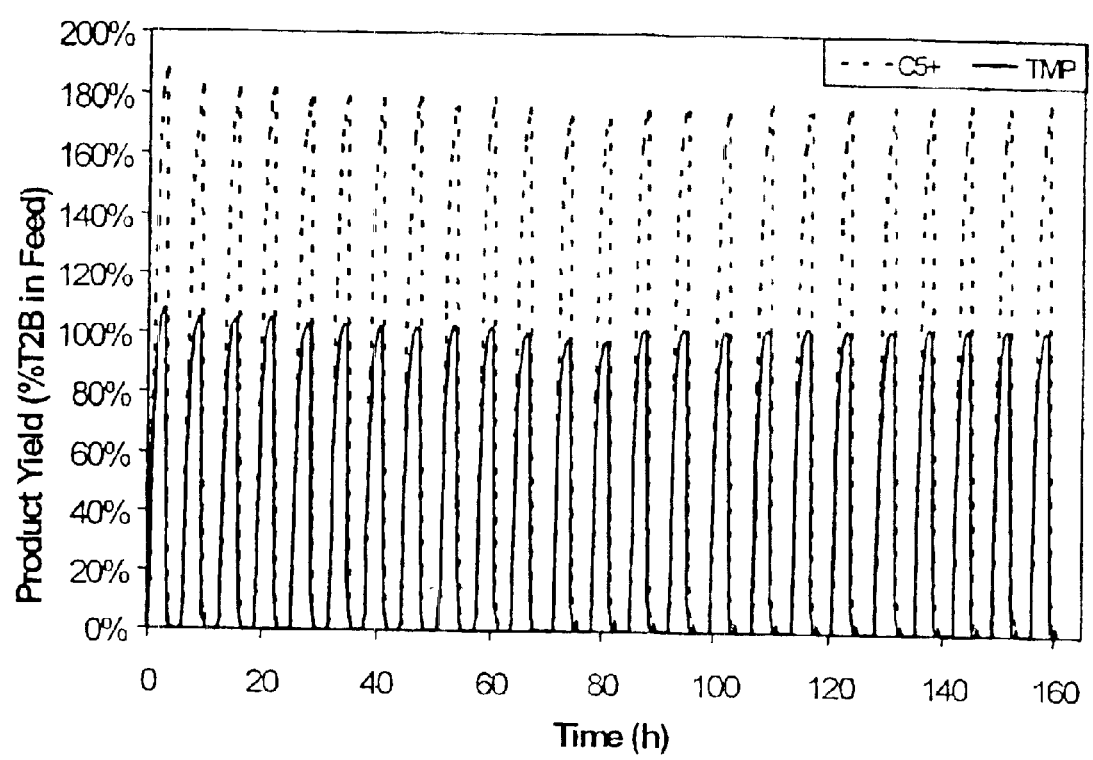
FIG. 15 shows total alkylate (C5+) and trimethylpentanes (TMP) product yields for a multiple reactivation experiment with reaction at 60° C., 1600 psig, an OWHSV of 0.2 g trans-2-butene (g catalyst)$^{-1}$ h$^{-1}$, inlet isobutane: trans-2-butene molar ratio of 20:1, in the plug flow reactor with recycle. The recycle ratio was 12:1. Reactivation was at 180°

Recycle plug flow experiments utilizing multiple reactivation runs (more than one reactivation) were conducted as described in Example Set 5 above, at an OWHSV of 0.2 g trans-2-butene (g catalyst)$^{-1}$ h$^{-1}$. Reactivation was again with isobutane as above; the reactivation criteria were that the alkylation had proceeded to exactly 3 h of alkylation. FIGS. 15–20 show the C5+ and TMP production results and run times for a complete multiple reactivation experiment at an OWHSV of 0.2. FIG. 15 shows the C5+ and TMP yields (per unit butene fed to the alkylation reactor) versus total experimental run time. FIGS. 16–18 show the variations in reaction run time, % recovered catalyst activity, and product yields (per gram of catalyst) with each successive reactivation. Cumulative product yields and catalyst life are shown in FIGS. 19 and 20.

As shown in FIGS. 16–18, product yields and run times scarcely decreased after many reactivations, remaining over 100% of initial activity over the entire course of the experiment. Recall from Example Set 4 above that the reactive reactivation agent activates the catalyst active sites, increasing the initial rate of product formation and thus the product yields in any specified time period. Activity can thus be maintained at greater than 100% of initial activity levels for at least 23 reactivations, using 3 h of alkylation as the reactivation criterion.

As shown in FIG. 20, the reactivation procedure provided a net catalyst life of 3.0 days through 23 reactivations. However, based on the very slight rate of decline in catalyst activity with each successive reactivation even after 23 reactivations, it is certain that the catalyst activity would remain over 100% of initial activity after additional reactivations. The catalyst would also certainly remain at high activity levels through many further reactivations if the criterion for removal of the catalyst and/or oxidative regeneration were set at 95% or 90% of initial activity. In any event, the 3 days of catalyst activity obtained was an increase of 12–15 times the activity observed if the catalyst is run in single-use experiments completely to deactivation.

As shown in FIG. 19, total product yields were greatly increased using this reactivation method and strategy as compared to the single-use yields. Overall yields were less per alkylation run than those observed in Example Set 5 because the alkylation run time was lower (and thus the catalyst deactivation proceeded further before reactivation with isobutane). However, the net effect of reactivation at lower levels of catalyst deactivation was to increase the overall catalyst lifetime to sustainable or near-sustainable catalyst activity. This allowed higher overall amounts of product formation from the same batch of catalyst. In FIG. 16, the alkylation run times are shown to indicate a constant alkylation time of 3 hours.

Example 7

When the methods of the present invention are implemented in a CSTR rather than in a swing-column reactor system, the catalyst is removed from the reactor by gravity or forced flow, separated from the reaction mixture, mixed with a stream of fluid reactivating agent, and passed through a region with the temperature and pressure set for reactivation as described in the foregoing examples. This procedure permits the continuous reactivation of the alkylation catalyst before its complete deactivation.

Catalyst movement is not restricted to a CSTR. The regeneration process is adaptable to any type moving bed reactor system. A variety of reactor configurations can be utilized to transport catalyst from the alkylation reactor zone to the regeneration zone. The continuous reactivation process of the present invention can be adapted to maintain high catalytic activity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for reactivating a solid alkylation catalyst, comprising:

providing a solid alkylation catalyst that is at least partially deactivated by alkylation fouling agents;

contacting the solid alkylation catalyst with a fluid reactivating agent to remove at least one alkylation fouling agent, wherein the fluid reactivating agent is maintained at or above a critical point of the fluid reactivating agent and is dense enough to dissolve impurities, and wherein the fluid reactivating agent comprises an alkane having at least one tertiary carbon atom or a compound that is isomerized in the presence of the solid alkylation catalyst to form at least one tertiary carbon atom;

reacting the fluid reactivating agent with the at least one alkylation fouling agent; and desorbing the at least one alkylation fouling agent from the solid alkylation catalyst.

2. The method of claim 1, wherein providing a solid alkylation catalyst that is at least partially deactivated by alkylation fouling agents comprises providing a solid alkylation catalyst that is at least partially deactivated by long chain hydrocarbons having a high molecular weight and a low volatility.

3. The method of claim 2, wherein providing a solid alkylation catalyst that is at least partially deactivated by long chain hydrocarbons comprises providing a solid alkylation catalyst that is at least partially deactivated by carbocations.

4. The method of claim 1, wherein contacting the solid alkylation catalyst with a fluid reactivating agent to remove at least one alkylation fouling agent comprises contacting the solid alkylation catalyst with a fluid reactivating agent in the absence of alkylation.

5. The method of claim 1, wherein contacting the solid alkylation catalyst with a fluid reactivating agent to remove at least one alkylation fouling agent comprises contacting the solid alkylation catalyst with a fluid reactivating agent under conditions of pressure and temperature such that the fluid reactivating agent is at or above a critical point of the fluid reactivating agent and is dense enough to dissolve the alkylation fouling agents.

6. The method of claim 1, wherein contacting the solid alkylation catalyst with a fluid reactivating agent to remove at least one alkylation fouling agent comprises contacting the solid alkylation catalyst with a fluid reactivating agent that is dense enough to dissolve the at least one alkylation fouling agent and products of the reaction between the fluid reactivating agent and the at least one alkylation fouling agent.

7. The method of claim 1, wherein contacting the solid alkylation catalyst with a fluid reactivating agent to remove at least one alkylation fouling agent comprises contacting the solid alkylation catalyst with a solvent that reacts with the at least one alkylation fouling agent in a way that facilitates the removal of the at least one alkylation fouling agent, in total or in part, from a surface of the solid alkylation catalyst.

8. The method of claim 1, wherein contacting the solid alkylation catalyst with a fluid reactivating agent to remove at least one alkylation fouling agent comprises contacting the solid alkylation catalyst with a compound selected from the group consisting of isobutane, isopentane, and mixtures thereof.

9. The method of claim 1, wherein contacting the solid alkylation catalyst with a fluid reactivating agent to remove at least one alkylation fouling agent comprises contacting the solid alkylation catalyst with a compound selected from the group consisting of n-butane, n-pentane, and mixtures thereof.

10. The method of claim 1, wherein contacting the solid alkylation catalyst with a fluid reactivating agent to remove at least one alkylation fouling agent comprises contacting the solid alkylation catalyst with a compound selected from the group consisting of 2,3-dimethylbutane, 2-methylpentane, 3-methylpentane, 2,3-dimethylpentane, 2,4-dimethylpentane, 2-methylhexane, 3-methylhexane, 2,3-dimethylhexane, 2,4-dimethylhexane, 2,5-dimethylhexane, 3,4-dimethylhexane, 2,3,4-trimethylhexane, and mixtures thereof.

11. The method of claim 1, wherein contacting the solid alkylation catalyst with a fluid reactivating agent to remove at least one alkylation fouling agent comprises contacting the solid alkylation catalyst with a compound selected from the group consisting of toluene, benzene, ethylbenzene, and mixtures thereof.

12. The method of claim 1, wherein contacting the solid alkylation catalyst with a fluid reactivating agent to remove at least one alkylation fouling agent comprises contacting the solid alkylation catalyst with the fluid reactivating agent at pressure and temperature conditions such that the fluid reactivating agent is a critical fluid.

13. The method of claim 1, wherein contacting the solid alkylation catalyst with a fluid reactivating agent to remove at least one alkylation fouling agent comprises contacting the solid alkylation catalyst with the fluid reactivating agent at a pressure equal to a critical pressure of the fluid reactivating agent and at a temperature equal to a critical temperature of the fluid reactivating agent.

14. The method of claim 1, wherein contacting the solid alkylation catalyst with a fluid reactivating agent to remove at least one alkylation fouling agent comprises contacting the solid alkylation catalyst with the fluid reactivating agent at pressure and temperature conditions such that the fluid reactivating agent is a supercritical fluid.

15. The method of claim 1, wherein contacting the solid alkylation catalyst with a fluid reactivating agent to remove at least one alkylation fouling agent comprises contacting the solid alkylation catalyst with the fluid reactivating agent at a pressure greater than a critical pressure of the fluid reactivating agent and at a temperature greater than a critical temperature of the fluid reactivating agent.

16. The method of claim 1, wherein contacting the solid alkylation catalyst with a fluid reactivating agent to remove at least one alkylation fouling agent comprises contacting the solid alkylation catalyst with the fluid reactivating agent at a pressure in the range of about a critical pressure of the fluid reactivating agent to about eight times the critical pressure of the fluid reactivating agent and a temperature in the range of about a critical temperature of the fluid reactivating agent to about one point three times the critical temperature of the fluid reactivating agent.

17. The method of claim 1, wherein contacting the solid alkylation catalyst with a fluid reactivating agent to remove at least one alkylation fouling agent comprises contacting the solid alkylation catalyst with isobutane at a temperature from about 130° C. to about 250° C.

18. The method of claim 1, wherein contacting the solid alkylation catalyst with a fluid reactivating agent to remove at least one alkylation fouling agent comprises contacting the solid alkylation catalyst with isobutane at a pressure in the range of about 200 psig to about 5000 psig.

19. The method of claim 1, wherein contacting the solid alkylation catalyst with a fluid reactivating agent to remove at least one alkylation fouling agent comprises contacting the solid alkylation catalyst with the fluid reactivating agent outside an alkylation reactor.

20. The method of claim 1, wherein contacting the solid alkylation catalyst with a fluid reactivating agent to remove at least one alkylation fouling agent comprises contacting the solid alkylation catalyst with the fluid reactivating agent in a one-step reactivation process outside an alkylation reactor, and wherein the fluid reactivating agent further includes dissolved hydrogen.

21. The method of claim 1, wherein desorbing the at least one alkylation fouling agent from the solid alkylation catalyst comprises transferring a hydride ion from the fluid reactivating agent to the at least one alkylation fouling agent.

22. The method of claim 1, wherein desorbing the at least one alkylation fouling agent from the solid alkylation catalyst comprises desorbing the at least one alkylation fouling agent without cracking the at least one alkylation fouling agent.

23. The method of claim 1, further comprising:
removing excess fluid reactivating agent with the impurities; and
recycling the excess fluid reactivating agent.

24. The method of claim 1, further comprising:
removing excess fluid reactivating agent with the impurities;
separating the impurities from the excess fluid reactivating agent to obtain purified fluid reactivating agent; and
recycling the purified fluid reactivating agent.

25. The method of claim 1, further comprising dissolving at least one gas with the fluid reactivating agent.

26. The method of claim 25, wherein dissolving at least one gas with the fluid reactivating agent comprises dissolving a species selected from the group consisting of hydrogen, oxygen, and mixtures thereof with the fluid reactivating agent.

27. A method for reactivating a solid alkylation catalyst, comprising:
providing a solid alkylation catalyst that is at least partially deactivated by alkylation fouling agents;
contacting the solid alkylation catalyst with a fluid reactivating agent under conditions of pressure and temperature such that the fluid reactivating agent is at or above a critical point of the fluid reactivating agent and is dense enough to dissolve impurities, wherein the fluid reactivating agent is reactive with at least one of the alkylation fouling agents;
transferring a hydride ion from the fluid reactivating agent to the at least one of the alkylation fouling agents; and
desorbing the at least one of the alkylation fouling agents from the solid alkylation catalyst.

28. The method of claim 27, wherein providing a solid alkylation catalyst that is at least partially deactivated by alkylation fouling agents comprises providing a solid alkylation catalyst that is at least partially deactivated by long chain hydrocarbons having a high molecular weight and a low volatility.

29. The method of claim 28, wherein providing a solid alkylation catalyst that is at least partially deactivated by long chain hydrocarbons comprises providing a solid alkylation catalyst that is at least partially deactivated by carbocations.

30. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with a fluid reactivating agent in the absence of alkylation.

31. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with a fluid reactivating agent that is dense enough to dissolve the at least one of the alkylation fouling agents and products of the reaction between the fluid reactivating agent and the at least one of the alkylation fouling agents.

32. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with a solvent that reacts with the at least one of the alkylation fouling agents in a way that facilitates the removal of the at least one of the alkylation fouling agents, in total or in part, from a surface of the solid alkylation catalyst.

33. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with an alkane having at least one tertiary carbon atom or with a compound that is isomerized in the presence of the solid alkylation catalyst to form at least one tertiary carbon atom.

34. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with a compound selected from the group consisting of isobutane, isopentane, and mixtures thereof.

35. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with a compound selected from the group consisting of n-butane, n-pentane, and mixtures thereof.

36. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with a compound selected from the group consisting of 2,3-dimethylbutane, 2-methylpentane, 3-methylpentane, 2,3-dimethylpentane, 2,4-dimethylpentane, 2-methylhexane, 3-methylhexane, 2,3-dimethylhexane, 2,4-dimethylhexane, 2,5-dimethylhexane, 3,4-dimethylhexane, 2,3,4-trimethylhexane, and mixtures thereof.

37. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with a compound selected from the group consisting of toluene, benzene, ethylbenzene, and mixtures thereof.

38. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with the fluid reactivating agent at pressure and temperature conditions such that the fluid reactivating agent is a critical fluid.

39. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with the fluid reactivating agent at a pressure equal to a critical pressure of the fluid reactivating agent and at a temperature equal to a critical temperature of the fluid reactivating agent.

40. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with the fluid reactivating agent at pressure and temperature conditions such that the fluid reactivating agent is a supercritical fluid.

41. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with the fluid reactivating agent at a pressure greater than a critical pressure of the fluid reactivating agent and at a temperature greater than a critical temperature of the fluid reactivating agent.

42. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with the fluid reactivating agent at a pressure in the range of about a critical pressure of the fluid reactivating agent to about eight times the critical pressure of the fluid reactivating agent and a temperature in the range of about a critical temperature of the fluid reactivating agent to about one point three times the critical temperature of the fluid reactivating agent.

43. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with isobutane at a temperature from about 130° C. to about 250° C.

44. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with isobutane at a pressure in the range of about 200 psig to about 5000 psig.

45. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with the fluid reactivating agent outside an alkylation reactor.

46. The method of claim 27, wherein contacting the solid alkylation catalyst with a fluid reactivating agent under conditions of pressure and temperature such that the fluid reactivating agent is at or above a critical point of the fluid reactivating agent and is dense enough to dissolve impurities comprises contacting the solid alkylation catalyst with the fluid reactivating agent in a one-step reactivation process outside an alkylation reactor, and wherein the fluid reactivating agent further includes dissolved hydrogen.

47. The method of claim 27, wherein desorbing the at least one of the alkylation fouling agents from the solid alkylation catalyst comprises desorbing the at least one of the alkylation fouling agents without cracking the at least one of the alkylation fouling agents.

48. The method of claim 27, further comprising:
removing excess fluid reactivating agent with the impurities; and
recycling the excess fluid reactivating agent.

49. The method of claim 27, further comprising:
removing excess fluid reactivating agent with the impurities;
separating the impurities from the excess fluid reactivating agent to obtain purified fluid reactivating agent; and
recycling the purified fluid reactivating agent.

50. The method of claim 27, further comprising dissolving at least one gas with the fluid reactivating agent.

51. The method of claim 50, wherein dissolving at least one gas with the fluid reactivating agent comprises dissolving a species selected from the group consisting of hydrogen, oxygen, and mixtures thereof with the fluid reactivating agent.

52. A method for reactivating a solid alkylation catalyst, comprising:
providing a solid alkylation catalyst that is at least partially deactivated by alkylation fouling agents, at least one of the alkylation fouling agents comprising a carbocation;
contacting the solid alkylation catalyst with a fluid reactivating agent under near-critical gas, near-critical liquid, critical, or supercritical conditions of pressure and temperature such that the fluid reactivating agent is dense enough to dissolve impurities, wherein the fluid reactivating agent is reactive with the at least one of the alkylation fouling agents;
transferring a hydride ion from the fluid reactivating agent to the at least one of the alkylation fouling agents; and
desorbing the at least one of the alkylation fouling agents from the solid alkylation catalyst without cracking the at least one of the alkylation fouling agents.

53. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with a fluid reactivating agent in the absence of alkylation.

54. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with a fluid reactivating agent that is dense enough to dissolve the at least one of the alkylation fouling agents and products of the reaction between the fluid reactivating agent and the at least one of the alkylation fouling agents.

55. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with a solvent that reacts with the at least one of the alkylation fouling agents in a way that facilitates the removal of the at least one of the alkylation fouling agents, in total or in part, from a surface of the solid alkylation catalyst.

56. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with an alkane having at least one tertiary carbon atom or with a compound that is isomerized in the presence of the solid alkylation catalyst to form at least one tertiary carbon atom.

57. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with a compound selected from the group consisting of isobutane, isopentane, and mixtures thereof.

58. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with a compound selected from the group consisting of n-butane, n-pentane, and mixtures thereof.

59. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with a compound selected from the group consisting of 2,3-dimethylbutane, 2-methylpentane, 3-methylpentane, 2,3-dimethylpentane, 2,4-dimethylpentane, 2-methylhexane, 3-methylhexane, 2,3-dimethylhexane, 2,4-dimethylhexane, 2,5-dimethylhexane, 3,4-dimethylhexane, 2,3,4-trimethylhexane, and mixtures thereof.

60. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with a compound selected from the group consisting of toluene, benzene, ethylbenzene, and mixtures thereof.

61. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with the fluid reactivating agent at a pressure in the range of about a critical pressure of the fluid reactivating agent to about eight times the critical pressure of the fluid reactivating agent and a temperature in the range of about a critical temperature of the fluid reactivating agent to about one point three times the critical temperature of the fluid reactivating agent.

62. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with isobutane at a temperature from about 130° C. to about 250° C.

63. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with isobutane at a pressure in the range of about 200 psig to about 5000 psig.

64. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with the fluid reactivating agent outside an alkylation reactor.

65. The method of claim 52, wherein contacting the solid alkylation catalyst with a fluid reactivating agent under near-critical gas, near-critical liquid, critical, or supercritical conditions of pressure and temperature such that the fluid reactivating agent is dense enough to dissolve impurities comprises contacting the solid alkylation catalyst with the fluid reactivating agent in a one-step reactivation process outside an alkylation reactor, and wherein the fluid reactivating agent further includes dissolved hydrogen.

66. The method of claim 52, further comprising:
removing excess fluid reactivating agent with the impurities; and
recycling the excess fluid reactivating agent.

67. The method of claim 52, further comprising:
removing excess fluid reactivating agent with the impurities;
separating the impurities from the excess fluid reactivating agent to obtain purified fluid reactivating agent; and
recycling the purified fluid reactivating agent.

68. The method of claim 52, further comprising dissolving at least one gas with the fluid reactivating agent.

69. The method of claim 68, wherein dissolving at least one gas with the fluid reactivating agent comprises dissolving a species selected from the group consisting of hydrogen, oxygen, and mixtures thereof with the fluid reactivating agent.

* * * * *